United States Patent [19]

Bedegrew et al.

[11] Patent Number: 5,529,264
[45] Date of Patent: Jun. 25, 1996

[54] LAUNCH VEHICLE SYSTEM

[75] Inventors: Ernest R. Bedegrew, Santa Cruz; Allan L. Chan, Pleasanton; James J. Connors, Santa Clara; Donald E. Damon, Danville; Kenneth W. Epstein, San Jose; Daniel H. Hada, Cupertino; Robert M. Heath, Sunnyvale; Michael B. Prewitt, San Jose; David L. Sutphin, Saratoga; Edward W. Szeto, Fremont; Howard D. Trudeau, Cupertino; Michael J. Vogel, Sunnyvale; Michael Wong, Santa Cruz; Larry Y. Hsu, Fremont; David P. Kennon, Saratoga; Robert J. MacDonald, San Jose; Steven D. Mettler, Santa Clara; Gene S. Ogden, Sunnyvale; Douglas B. Pereyda, Los Gatos; Chau N. Pham, Milpitas, all of Calif.

[73] Assignee: Lockheed Missiles & Space Company, Inc., Sunnyvale, Calif.

[21] Appl. No.: 198,818

[22] Filed: Feb. 18, 1994

[51] Int. Cl.$^6$ ................................. B64G 1/22; B64F 1/04
[52] U.S. Cl. ..................................... 244/118.2; 244/158 R; 244/63; 102/275.5; 102/274; 102/378
[58] Field of Search ............................ 244/158 R, 118.2, 244/122 AF, 131, 63; 102/377, 378, 272, 274, 275, 275.5; 267/174, 176; 89/1.14

[56] References Cited

U.S. PATENT DOCUMENTS

| | | |
|---|---|---|
| H1082 | 8/1992 | Andrew . |
| 2,604,045 | 7/1952 | Arnold ................................. 102/272 |
| 3,199,455 | 8/1965 | Samms ................................. 102/378 |
| 3,357,356 | 12/1967 | Bischoff ................................. 102/378 |
| 3,362,290 | 1/1968 | Carr et al. ............................. 102/378 |
| 3,453,960 | 7/1969 | Qualls ................................. 102/378 |
| 4,796,839 | 1/1989 | Davis . |
| 4,867,357 | 9/1989 | Inglis et al. ............................. 102/377 |
| 4,964,340 | 10/1990 | Daniels et al. . |
| 5,046,426 | 9/1991 | Julien et al. ............................. 102/377 |
| 5,072,896 | 12/1991 | McIntyre et al. ................... 244/122 AF |
| 5,104,067 | 4/1992 | McIntyre et al. ................... 244/122 AF |
| 5,129,602 | 7/1992 | Leonard . |
| 5,141,181 | 8/1992 | Leonard . |
| 5,143,328 | 9/1992 | Leonard . |
| 5,167,386 | 12/1992 | Laquer et al. ........................... 244/121 |
| 5,172,815 | 12/1992 | Fried . |
| 5,203,844 | 4/1993 | Leonard . |
| 5,217,188 | 6/1993 | Thole . |
| 5,228,642 | 7/1993 | Bright . |

OTHER PUBLICATIONS

George P. Sutton, "Choosing a Rocket Engine" Space/Aeronautics–Dec. 1968.
Jack M. Vogel, "The Pocket Rocket Reader" date unknown.
Howard Trudeau "Lockheed Launch Vehicles" Apr. 1993.
Martin Marietta "Titan III Commercial Launch Services" 1987.
S. O. Perry and J. R. Clark "Space Research Vehicle Systems developed from NASA Scout" Aug. 1959.
Mark H. Daniels and James E. Davidson "Conestoga (List continued on next page.)

*Primary Examiner*—Andres Kashnikow
*Assistant Examiner*—Virna Lissi Mojica
*Attorney, Agent, or Firm*—Oblon, Spivak, McClelland, Maier & Neustadt

[57] ABSTRACT

A launch vehicle system includes at least one primary solid fuel motor, a shroud for housing a payload and an attitude control system. The attitude control system is connected intermediate the primary solid fuel motor and the shroud. It has a circular outer wall and liquid fuel motors for exerting thrust along a longitudinal axis of the rocket system, and for controlling pitch, roll and yaw of the shroud. The attitude control system includes a support structure defining three pairs of fuel tank supporting zones, each zone having laterally extending supporting brackets connected to the outer wall. The attitude control system also includes connecting tubing for connecting outlets of sets of fuel tanks consisting of one, two and three pairs of fuel tanks to the liquid fuel motors.

4 Claims, 37 Drawing Sheets

OTHER PUBLICATIONS

Launch Vehicles" pp. 186 to 191 Aug. 1987 AIAA/DARPA Meeting on Lightweight Satellite Systems.

Michael D. Griffin and Joseph H. Jerger "Preliminary Design of the Industrial Launch Vehicle" pp. 241–247 AIAA/DARPA Meeting on lightweight satellite systems. Aug. 1987.

Norman E. Grizzell "Application of Fleet Ballistic Missile Components/Designs for Expendable Launch Vehicles" pp. 255–263 Aug. 1987 AIAA/DARPA Meeting on lightweight satellite systems.

Prime Aerospace Corporation–EPAC S–1 and S–11 Payload User's Manual Nov. 29, 1988.

NASA Facts–An educational services publication of the National Aeronautics and Space Administration–"United States Launch Vehicles for Peaceful Exploration of Space" vol. II, No. 5 Supplement–Date Unknown.

"All Solids Medium Launch Vehicle" publication No. 87193 Morton Thiokol, Inc. Oct. 16, 1986.

"Payload Launch Systems" Lockheed Aug. 1987.

7th Annual AIAA–Utah State University Conference on Small Satellites–Lockheed Missiles & Space Company, Inc. D. E. Davis, J. W. Angeli, A. J. MacLaren Sep. 13, 1993–Sep. 16, 1993.

"Conestoga II–A Low Cost Commercial Space Transport System" Second symposium on Space Industrialization––NASA Publication 2313 pp. 169–172, 177–180, 184, 186, 189. Richard Rasmussen Feb. 1989.

"International Aerospace Abstracts–Space Transportation Options and Opportunities" AIAA Library J. P. Loftus, Jr., R. C. Ried, R. B. Bristow 1987.

"Expendable Launch Vehicles Technology" Report to the US Senate and the House of Representatives–NASA Library–Jul. 1990.

"Understanding Rockets and Their Propulsion" pp. 25–36 Craig Kuentz–Apr. 1964.

"From Earth to Orbit–An Assessment of Transportation Options" National Academy Press, Washington D.C. 1992. NASA S&T Library Committee on Earth–to–Orbit Transportation Options, Aeronautics and Space Engineering Board, Commission on Engineering and Technical Systems, National Research Council.

"Assessment of Candidate Expendable Launch Vehicles for Large Payloads" National Academy Press, Washington D.C., Sep. 1984 Committee on NASA Scientific and Technological Program Reviews; Commission on Engineering and Technical Systems; National Research Council.

"US Access to Space–Launch Vehicle Choices for 1990–2010" Scott Pace––A Project Air Force Report–Mar. 1990.

"Guide to ELV's and the Commercial Launch Market"–Space Business News Staff 1986.

"Assured Access to Space 1986" Hearings before the Subcommittee on Space Science and Applications. No. 164–Donald K. Slayton 1987.

"Launch Options for the Future–Special Report" U.S. Congress, Office of Technology Assessment–Jul. 1988.

"Reducing Launch Operations Costs–New Technologies and Practices" Congress of the United States. Library of Congress Catalog No. 88–600539 Sep. 1988.

National Space Launch Program Report to Congress–NASA S&T Library Mar. 14, 1989.

Solid Rocket Motor Space Launch Vehicles–43rd Congress of the International Aeronautical Federation. A. J. MacLaren; H. D. Trudeau Aug. 1992.

Commercial Space Launch Act Jun. 5, 1984.

U.S. Congress Office of Technology Assessment, "Big Dumb Boosters: A Low–Cost Space Transportation Option" (Washington D.C.: US Government Printing Office, Sep. 88).

"Space Technology to Meet Future Needs" Committee on Advanced Space Technology, National Academy Press, Washington D.C. 1987.

Letter "Keep Our Rockets Simple" Aerospace America 1987.

U.S. Commercial Space Policy Guidelines 1991.

E' Prime Aerospace Corporation Oct. 14, 1987.

Super Zip Separations Systems–Fact Sheet–By Lockheed Missiles & Space Company (Date Unknown).

Saab Ericsson Space Technical Data (Date Unknown).

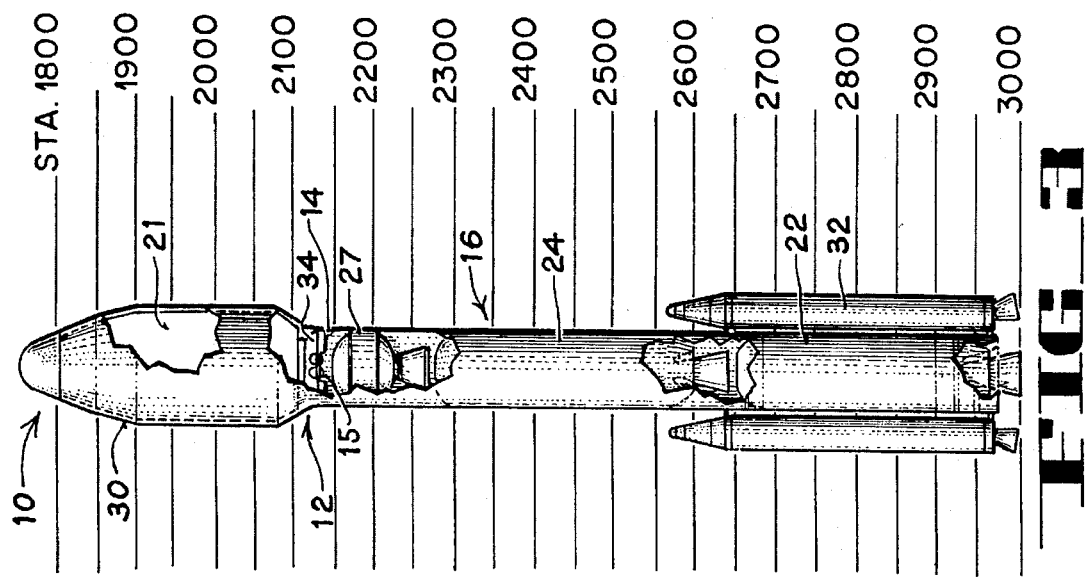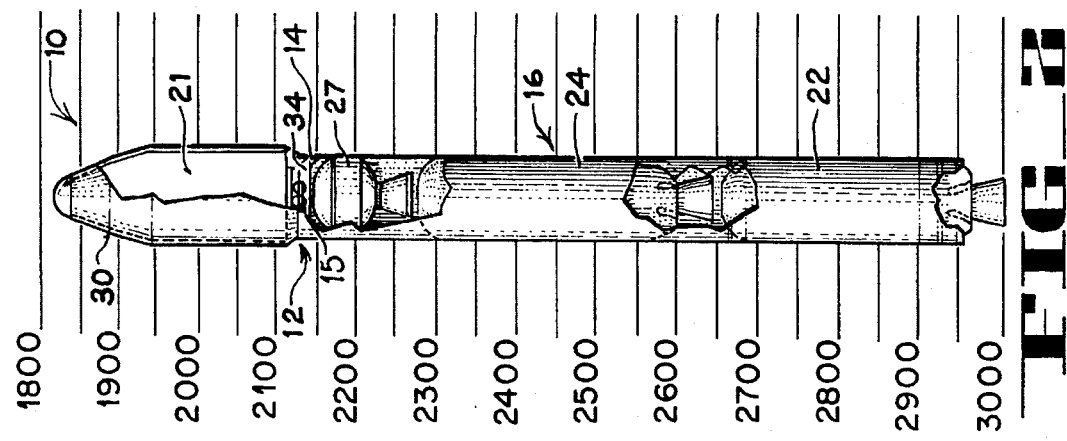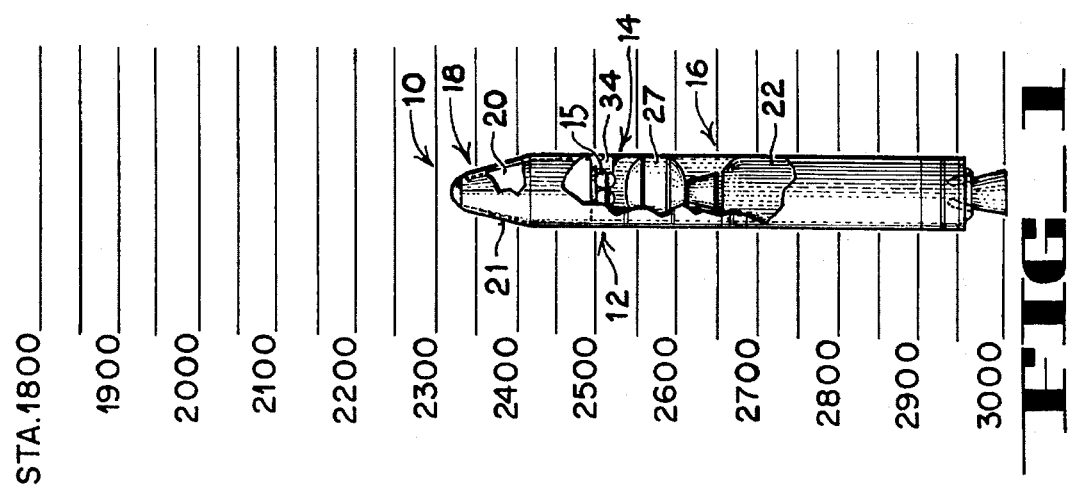

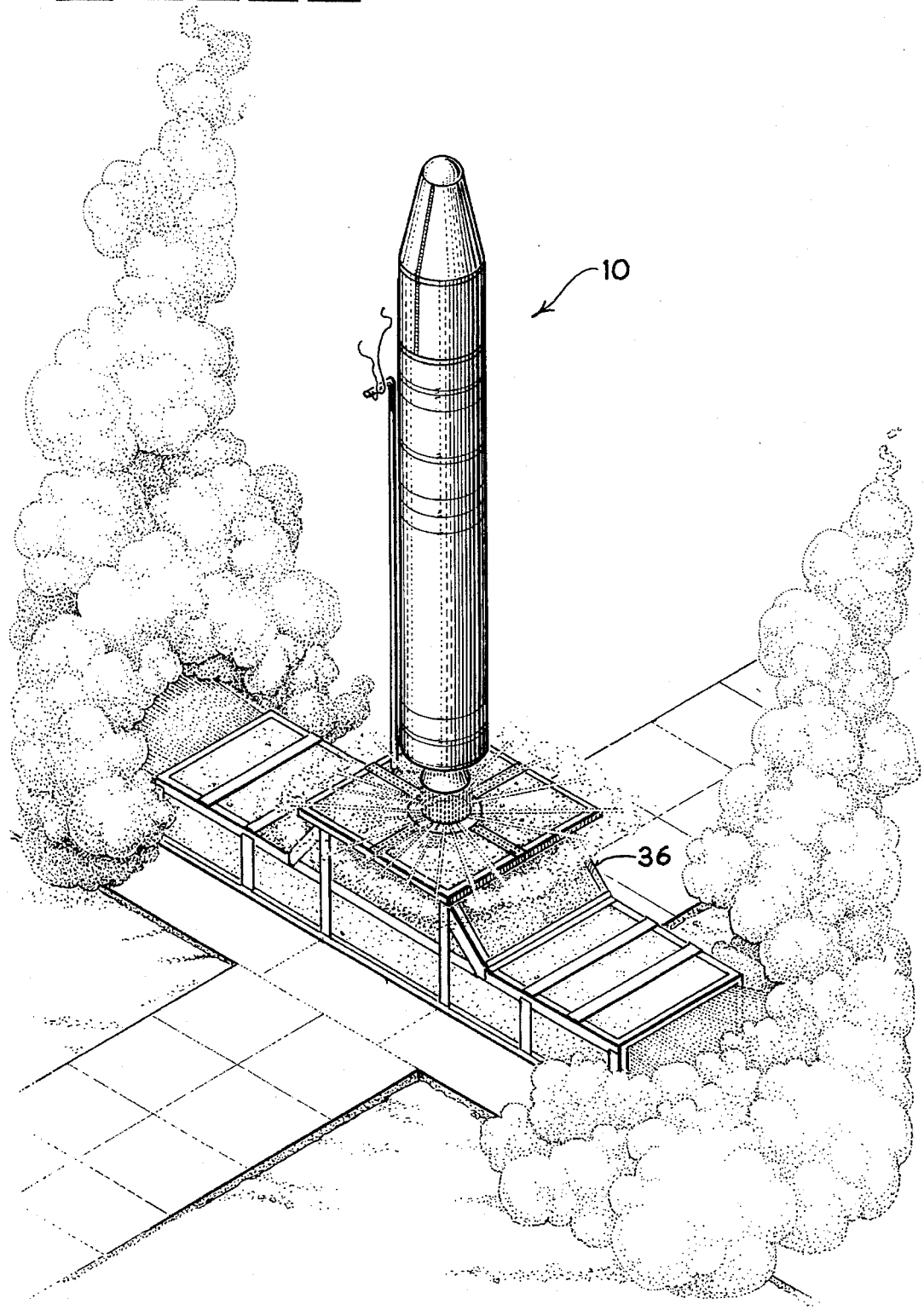

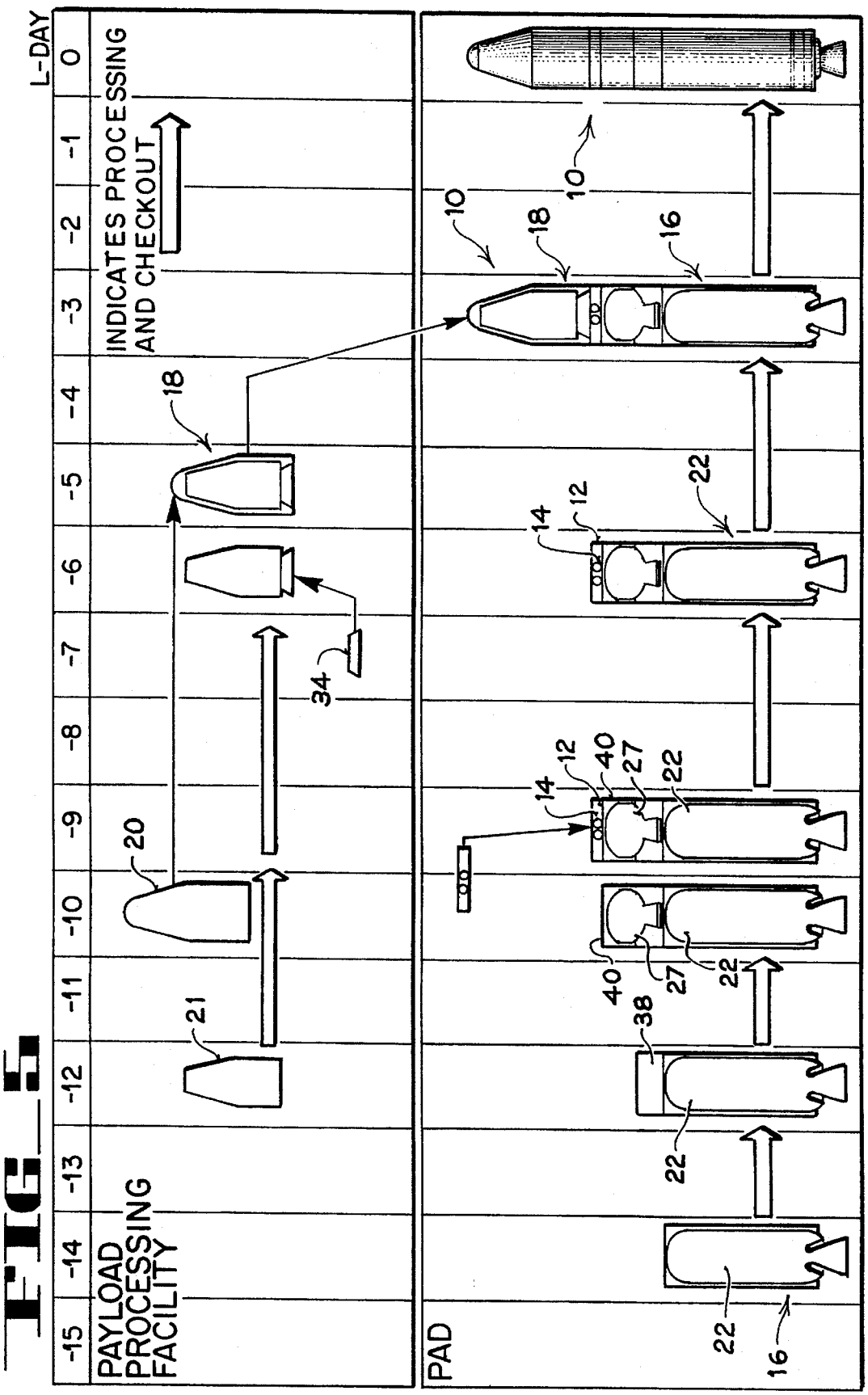

FIG_6
| MODE | LLV1 | LLV2 | LLV3 |
|---|---|---|---|
| AXIAL (1) | >30 HZ | >30 HZ | >30 HZ |
| LATERAL (2) | >15 HZ | >12 HZ | >11 HZ |
1. AXIAL MODE FREQUENCY REQUIREMENTS AVOID DYNAMIC COUPLING BETWEEN PAYLOAD AND BOOSTER IGNITION-FORCING FUNCTIONS
2. LATERAL MODE REQUIREMENTS AVOID DYNAMIC COUPLING BETWEEN PAYLOAD AND FIRST BENDING MODE OF THE LAUNCH VEHICLE
FIG_7
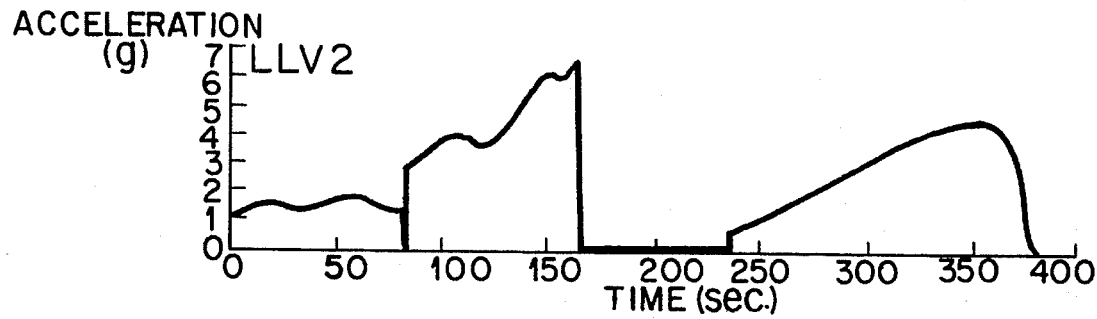
FIG_8
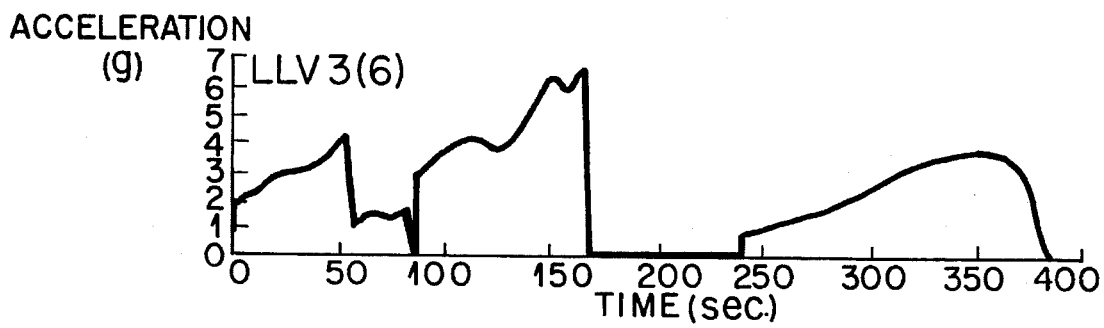
FIG_9

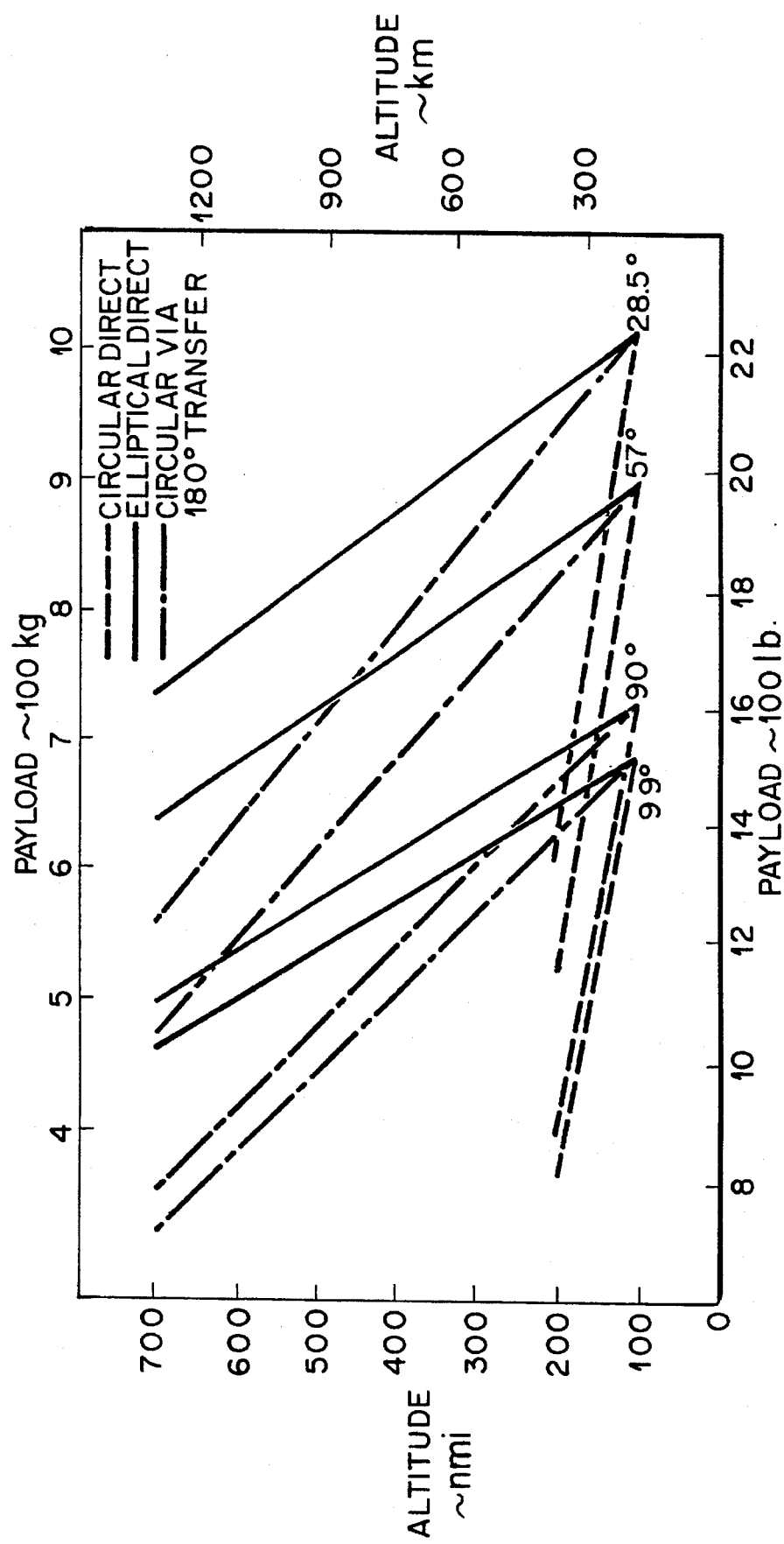
FIG_10

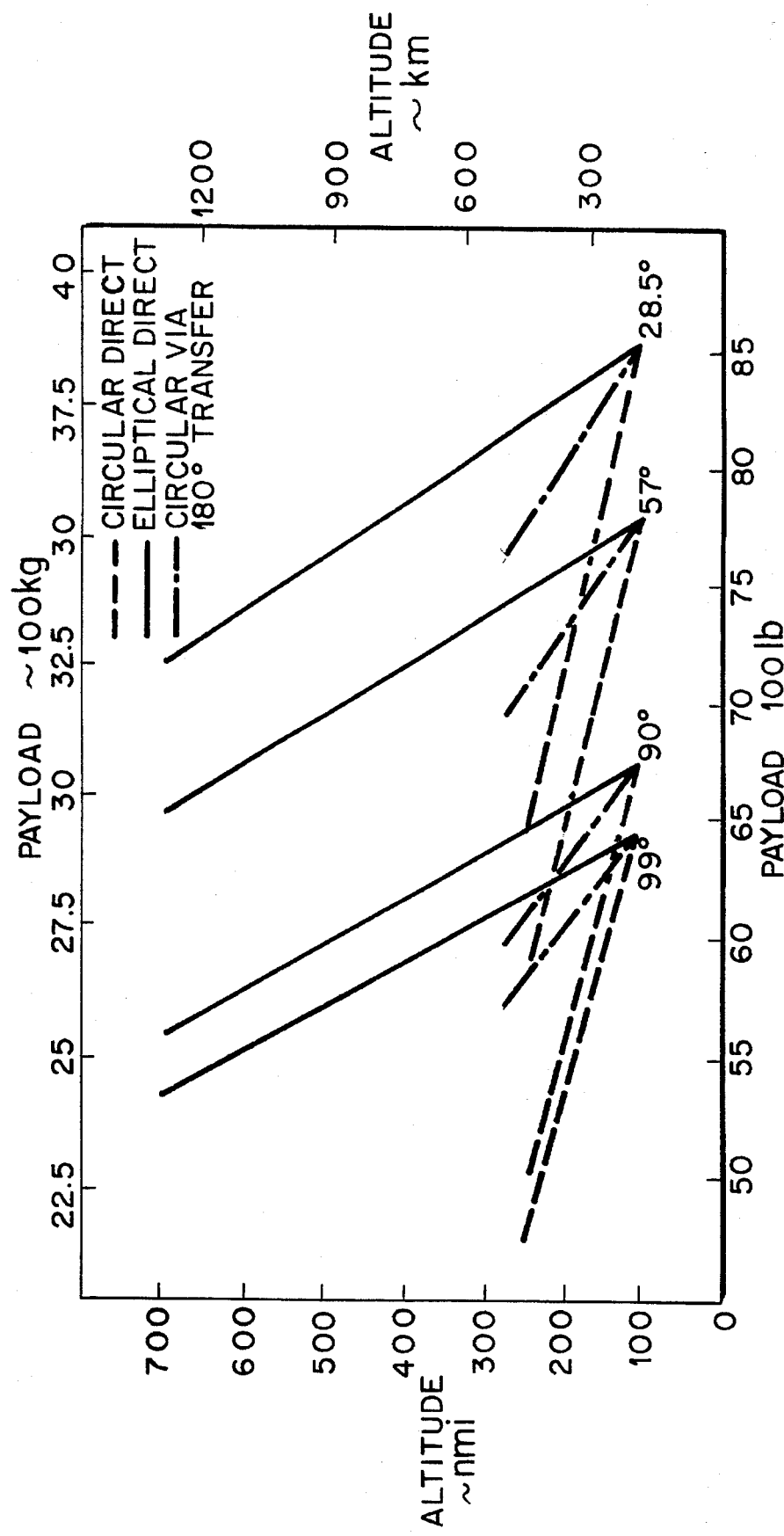
FIG_12

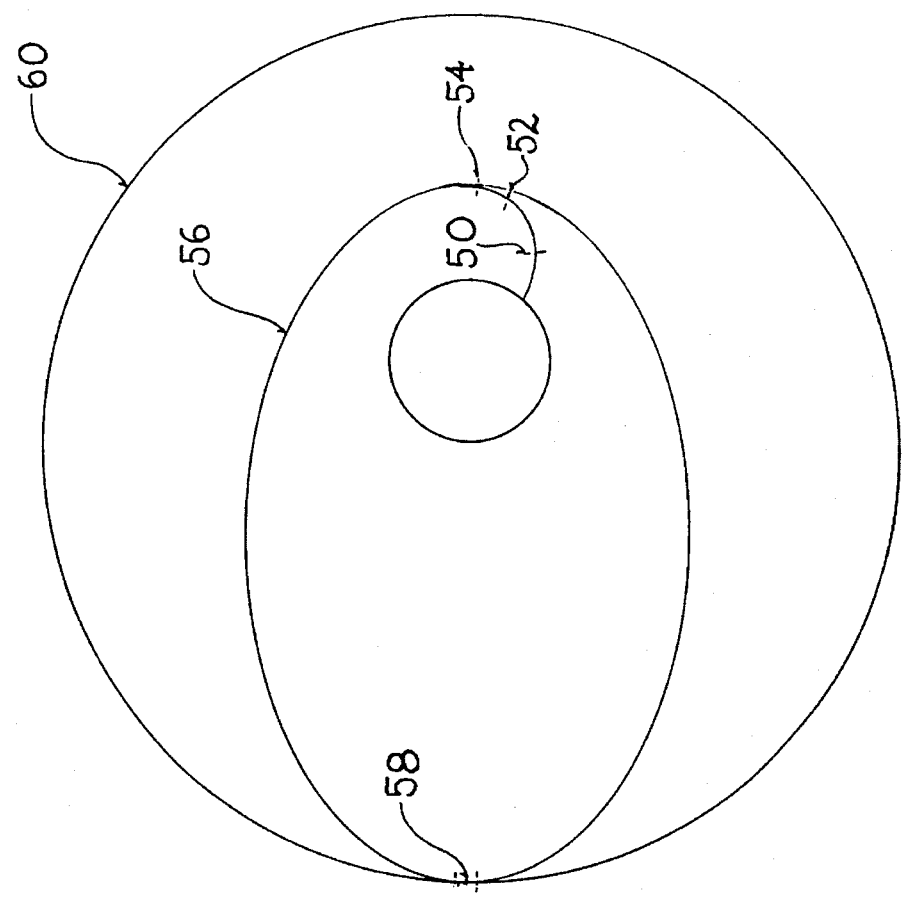
FIG_13

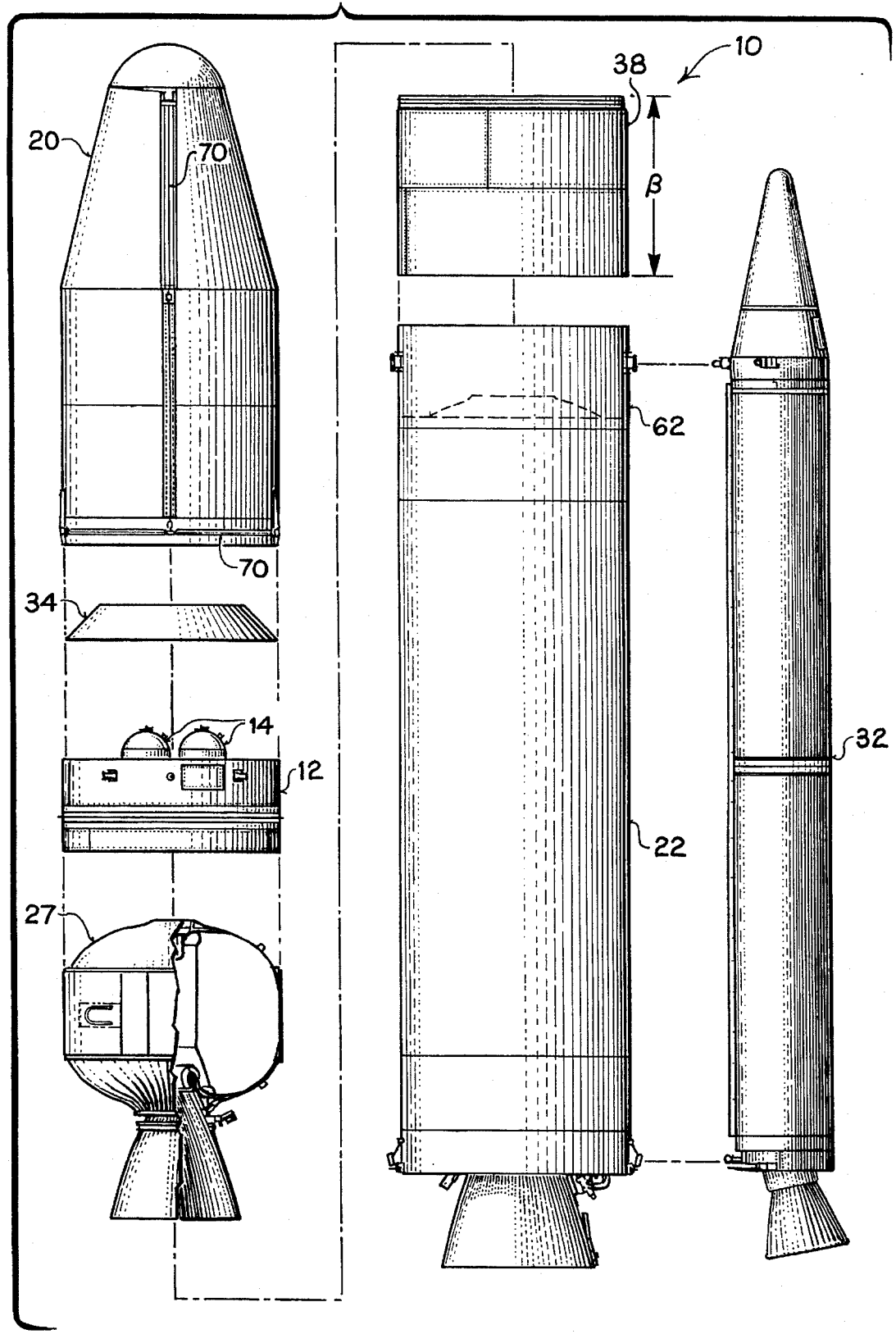
FIG_14

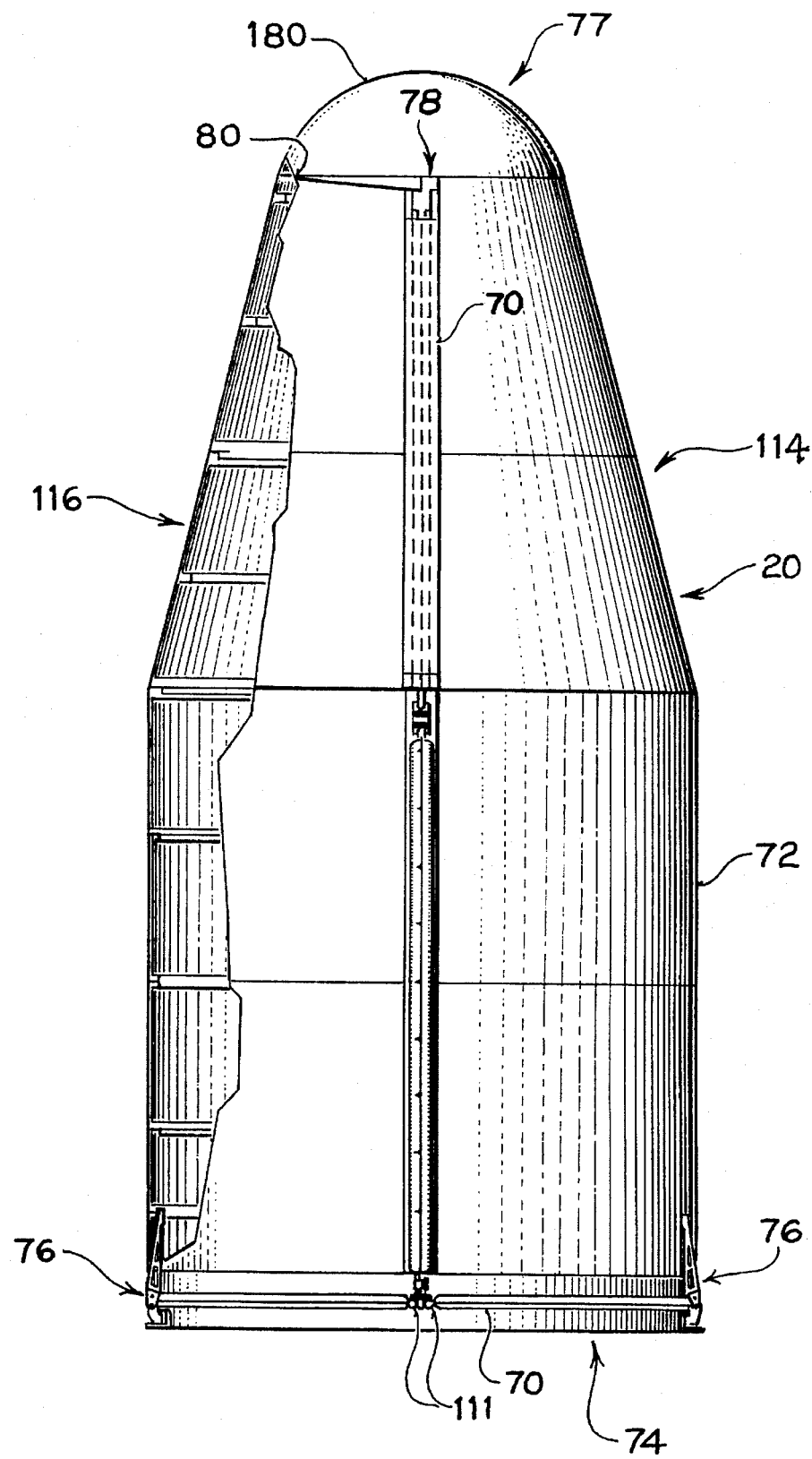
FIG_15

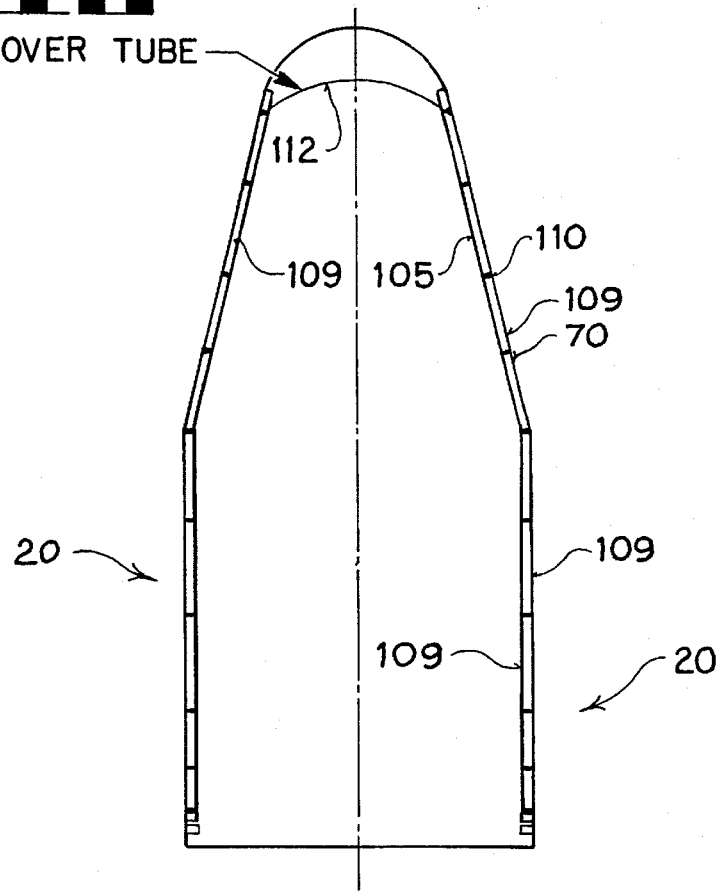
FIG_16
CROSSOVER TUBE
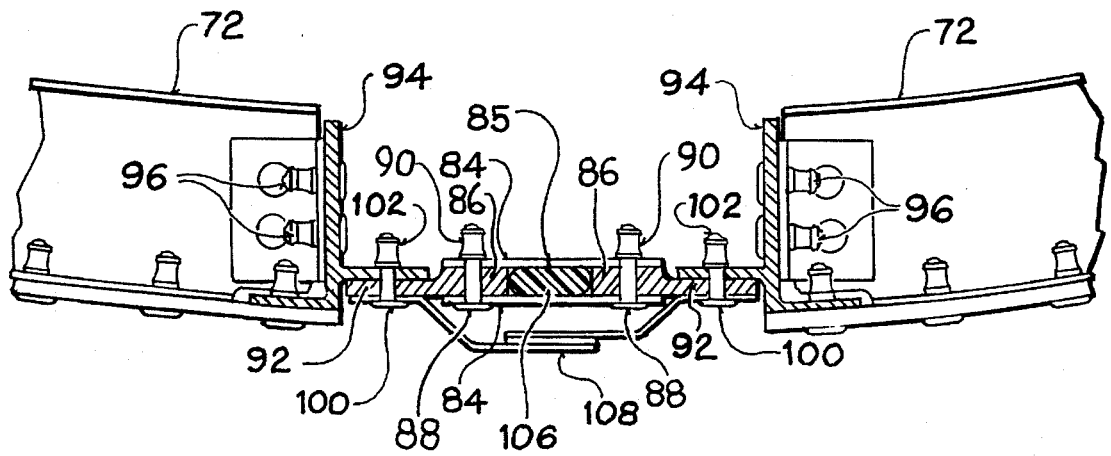
FIG_17

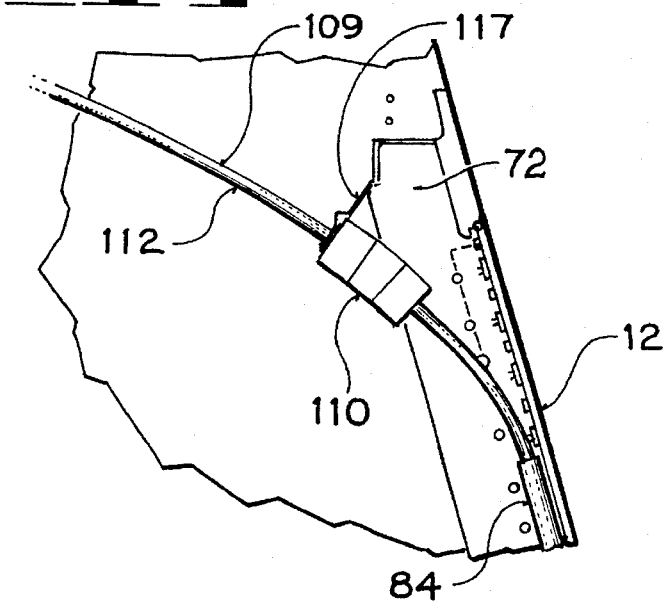
FIG_19
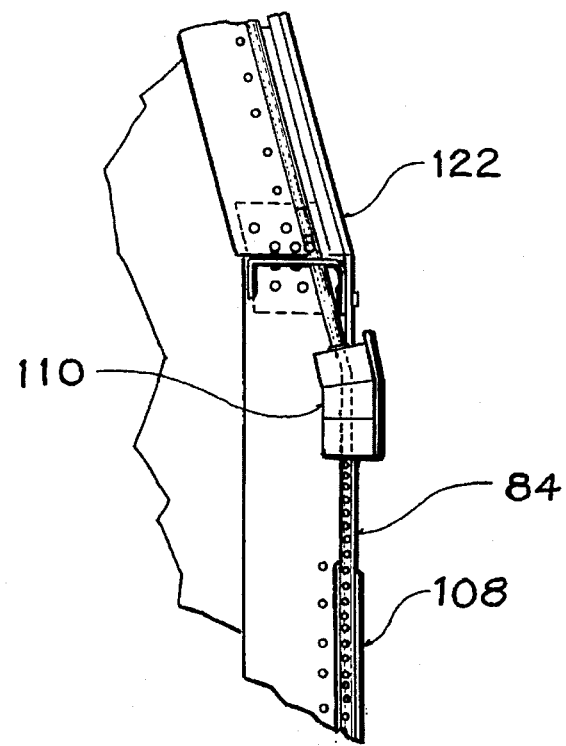
FIG_18

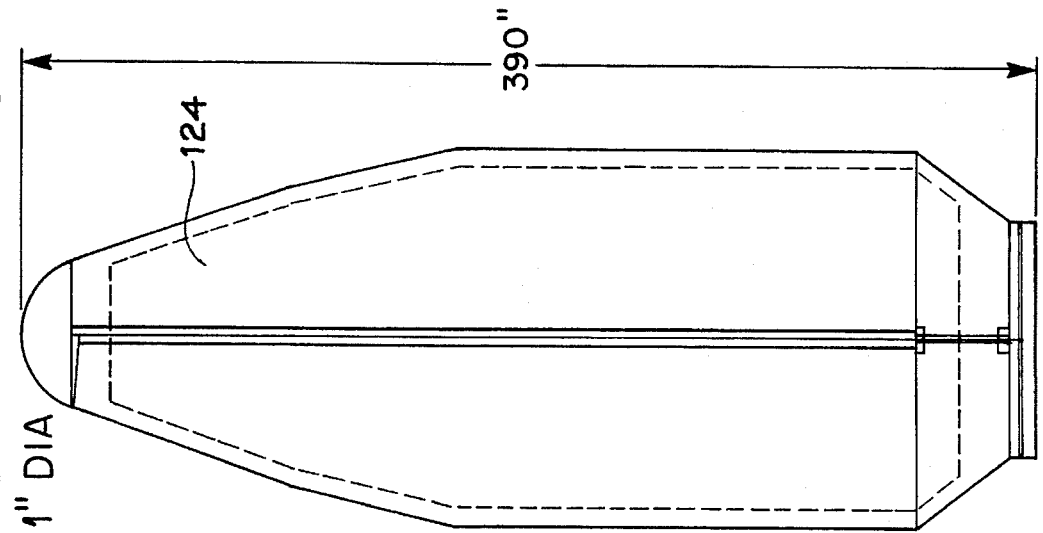
FIG_22
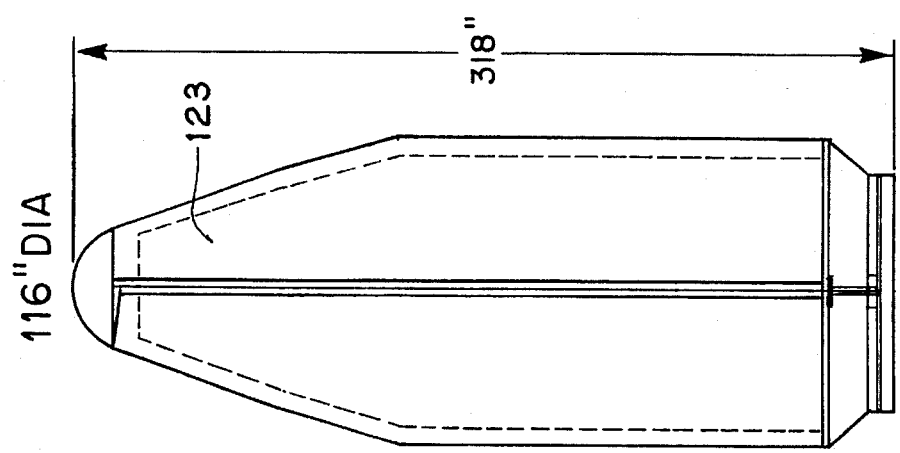
FIG_21
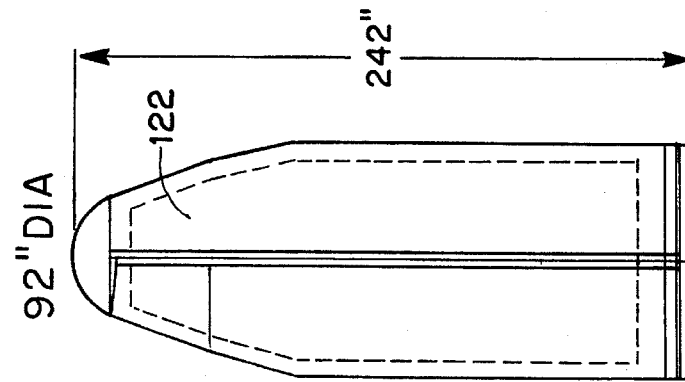
FIG_20

FIG_25
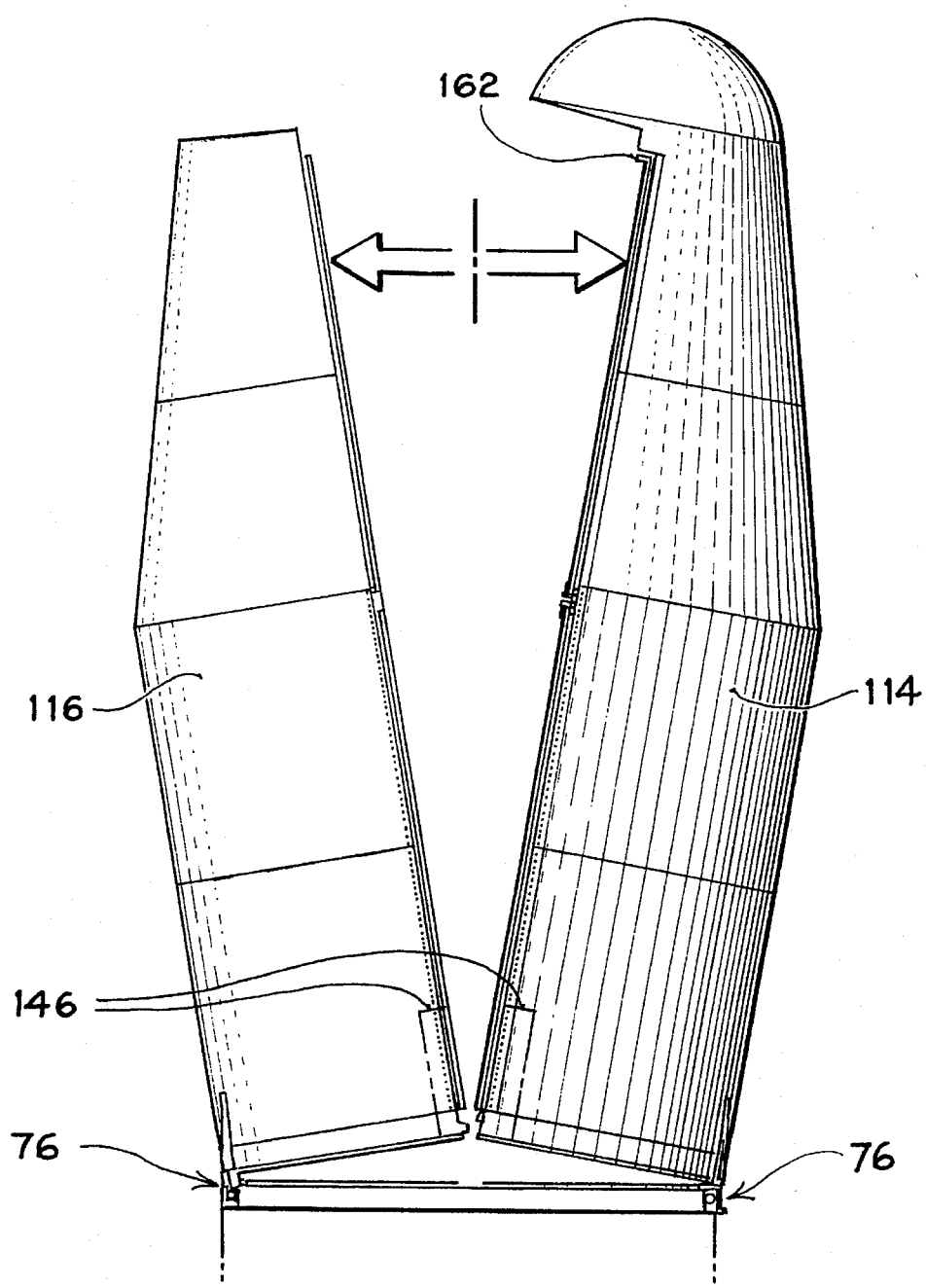

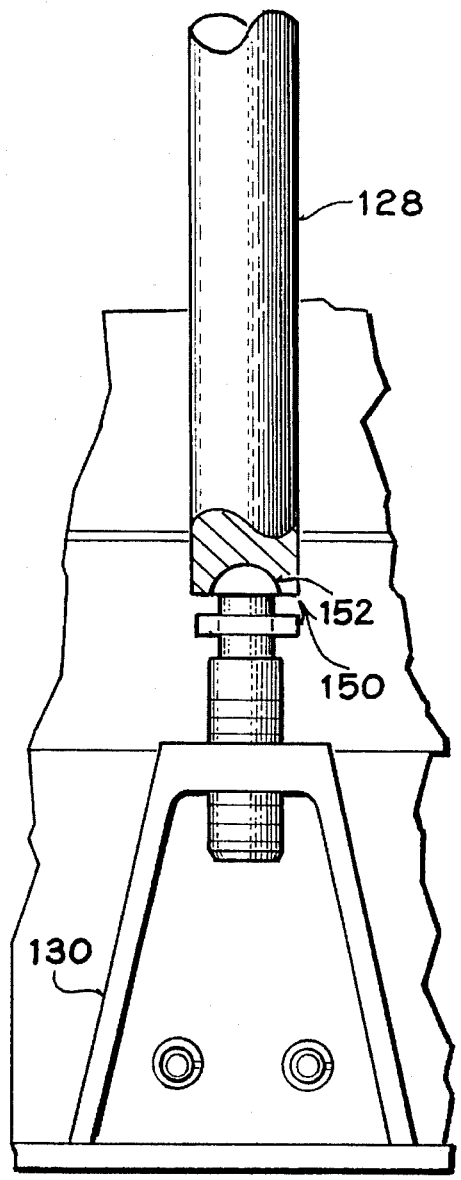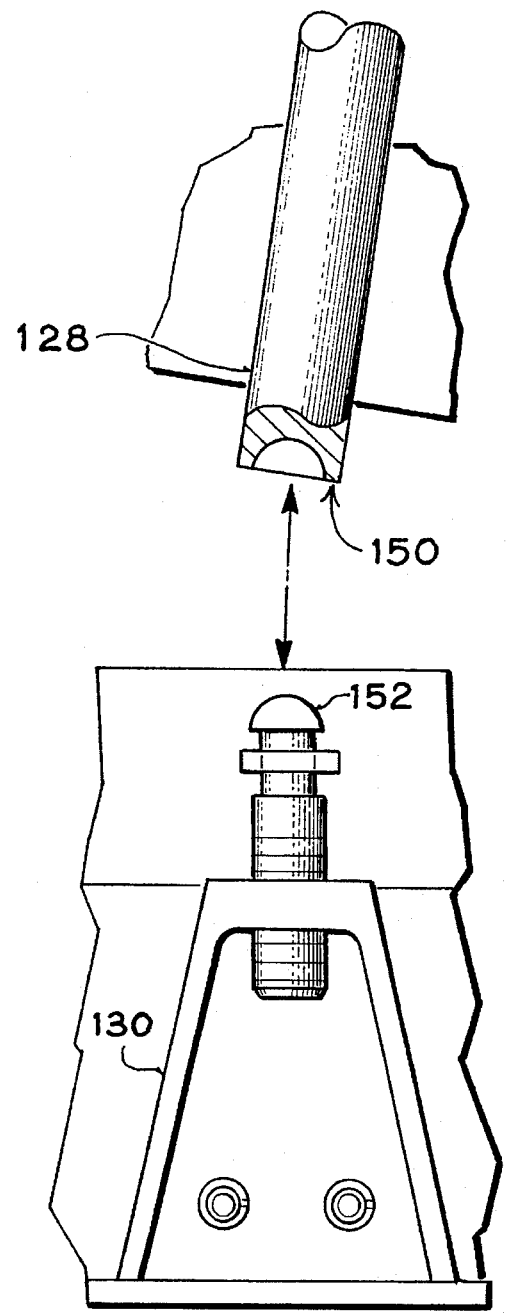
FIG_26  FIG_27

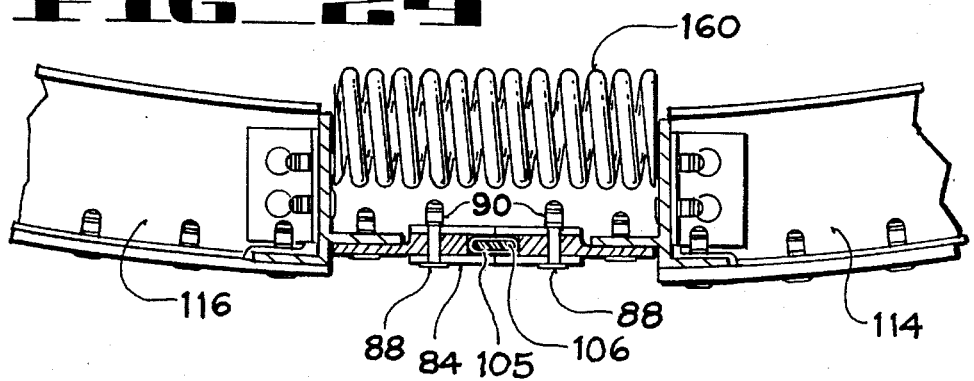
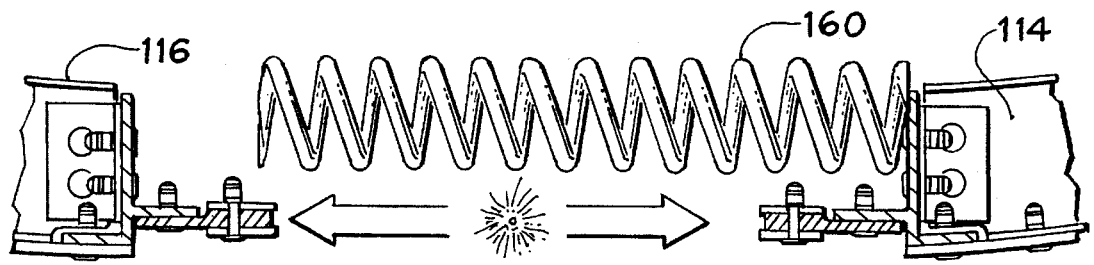
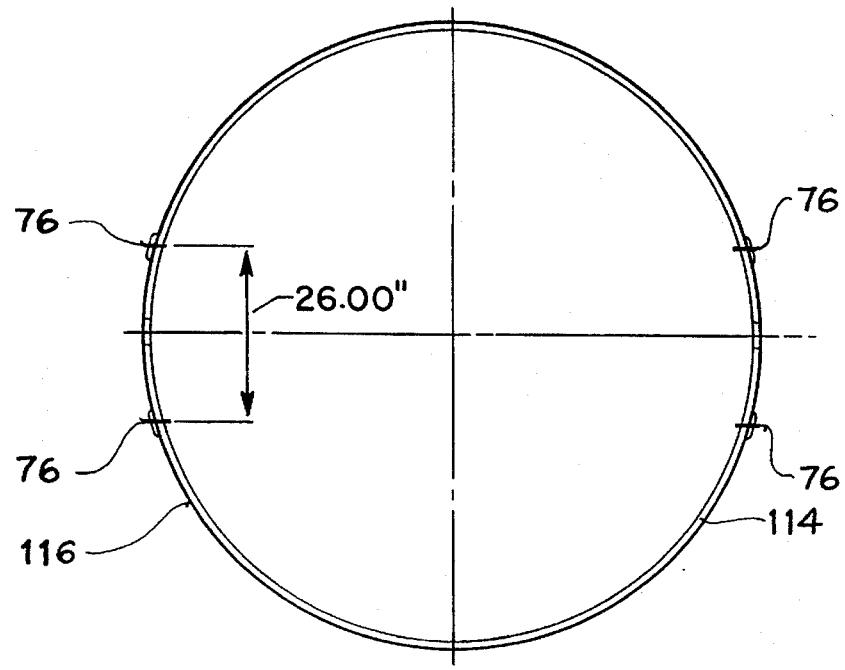

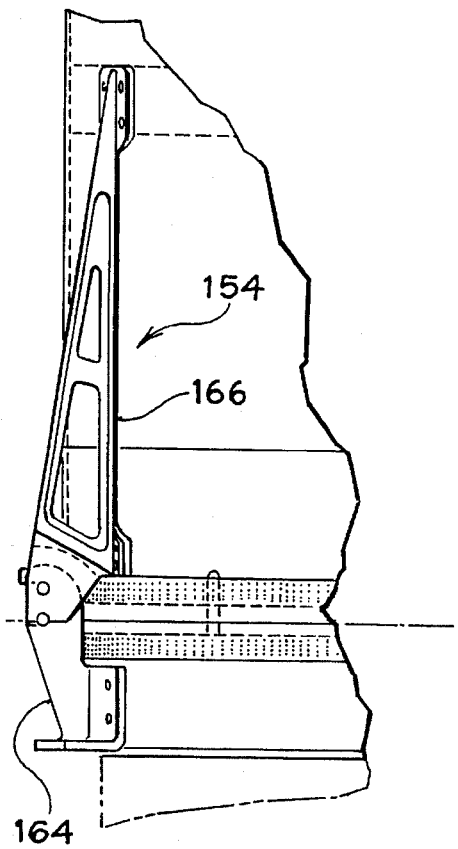
FIG_32
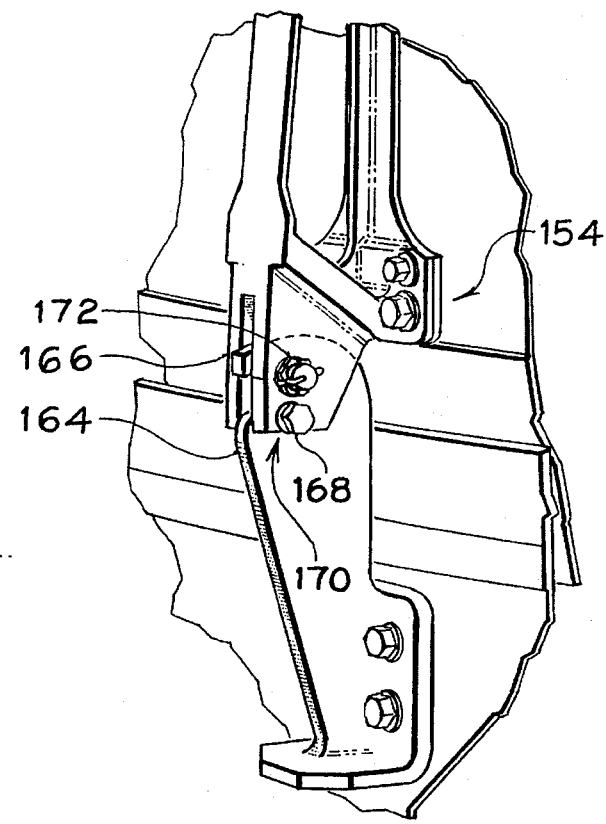
FIG_31
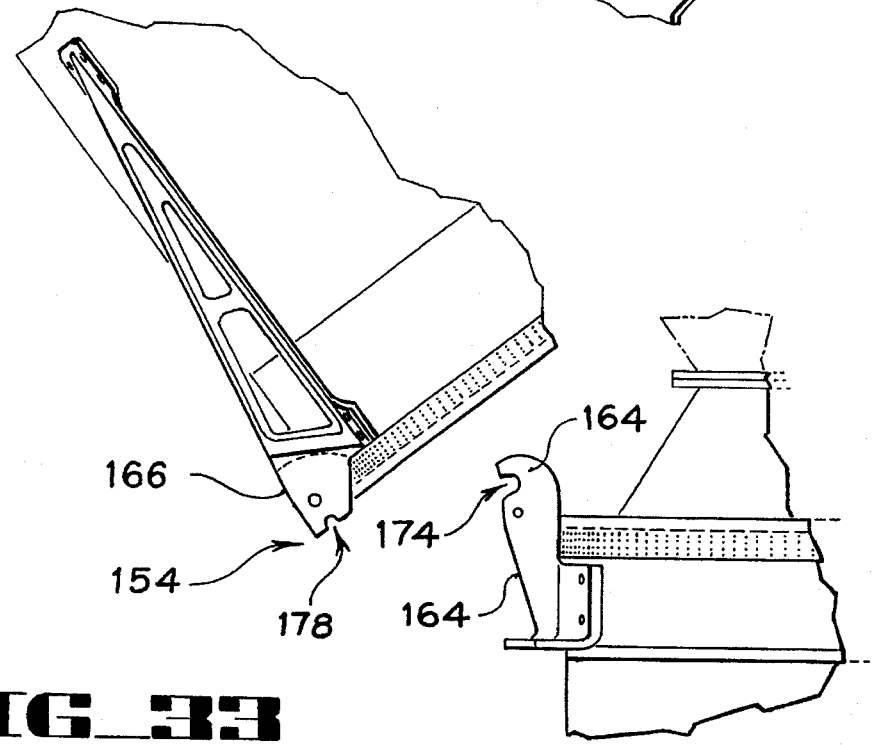
FIG_33

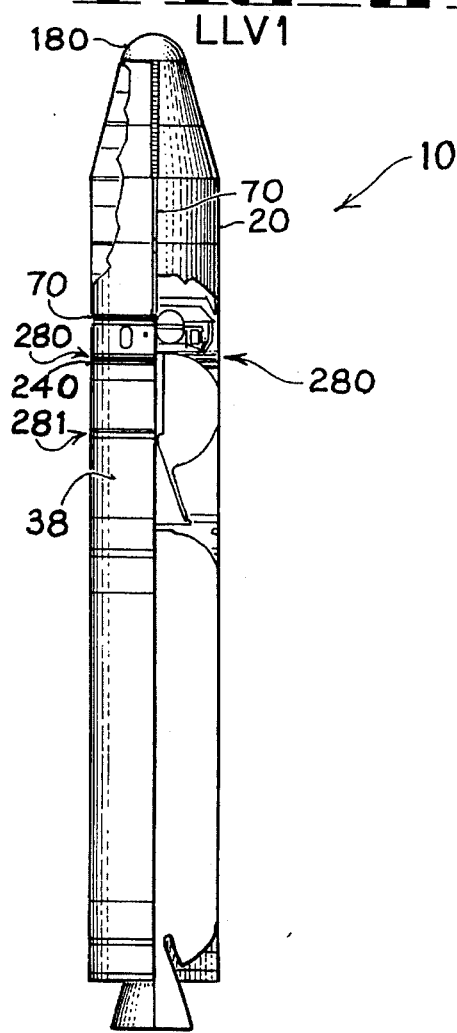
FIG_34
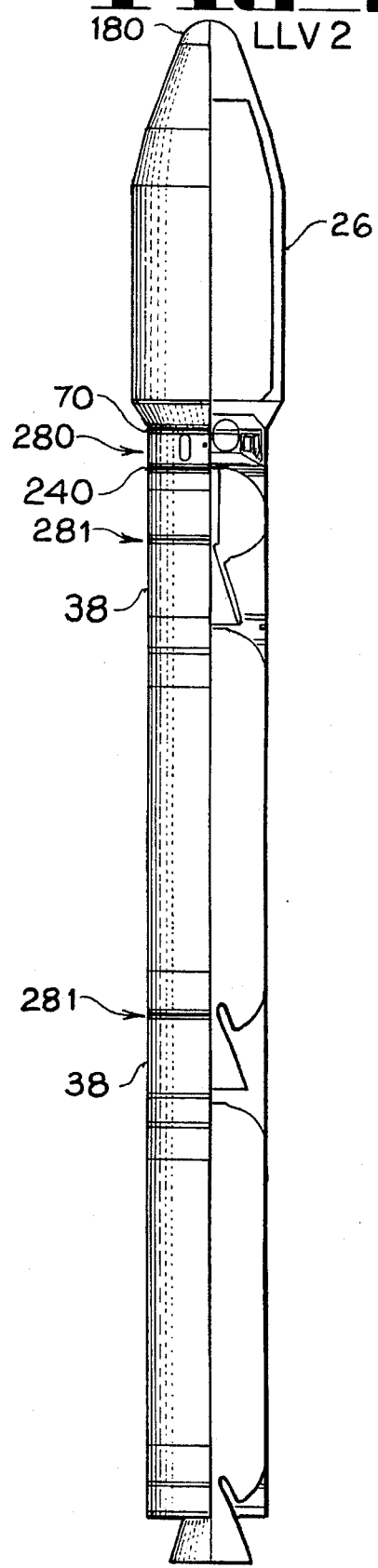
FIG_36
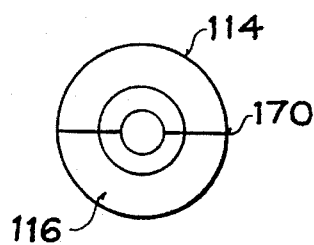
FIG_35

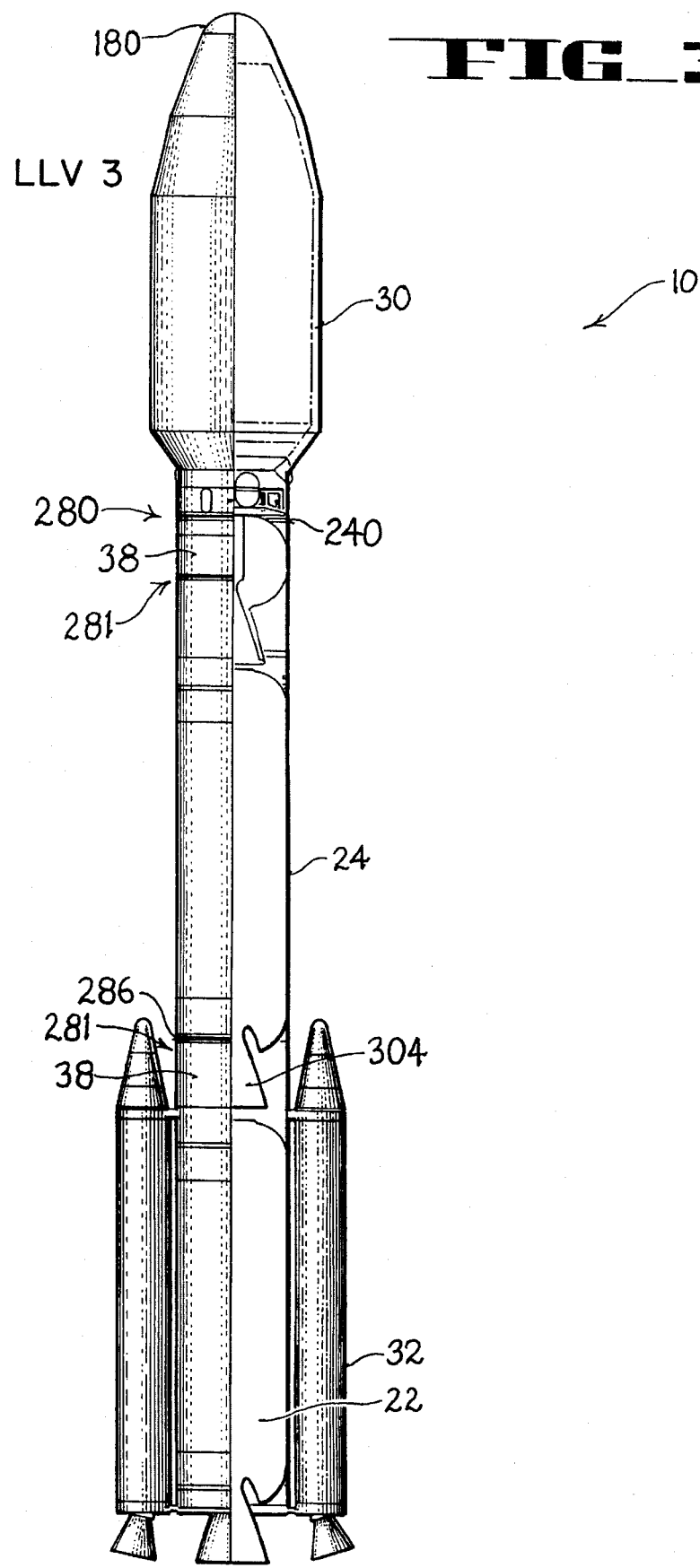

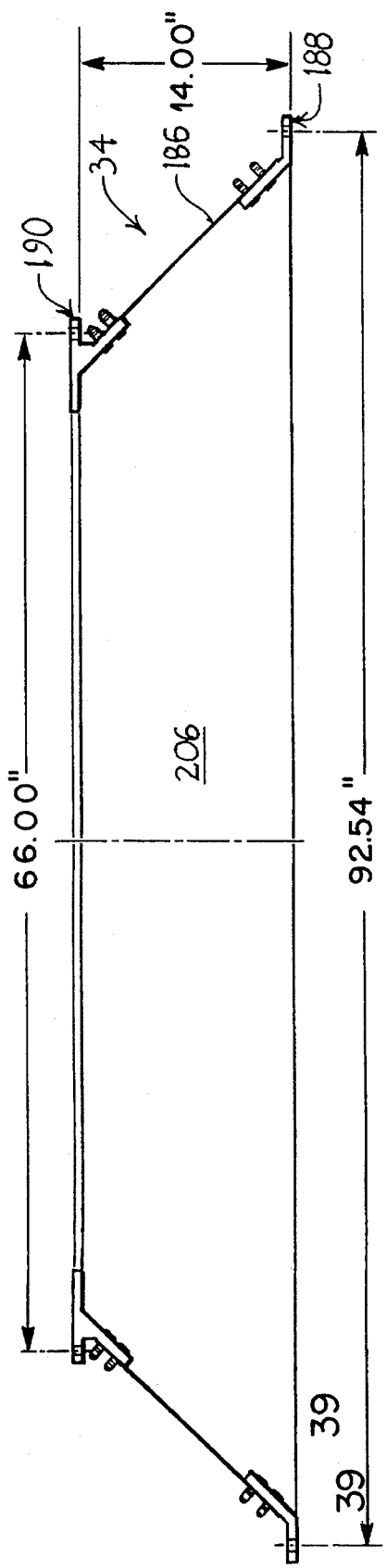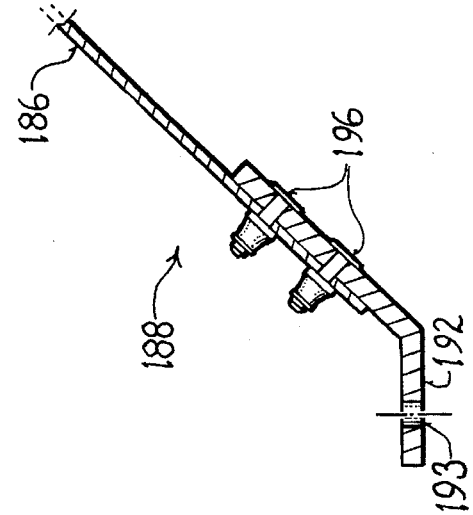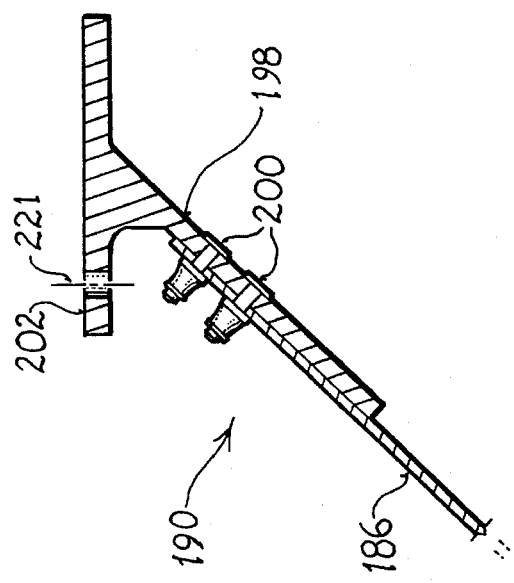

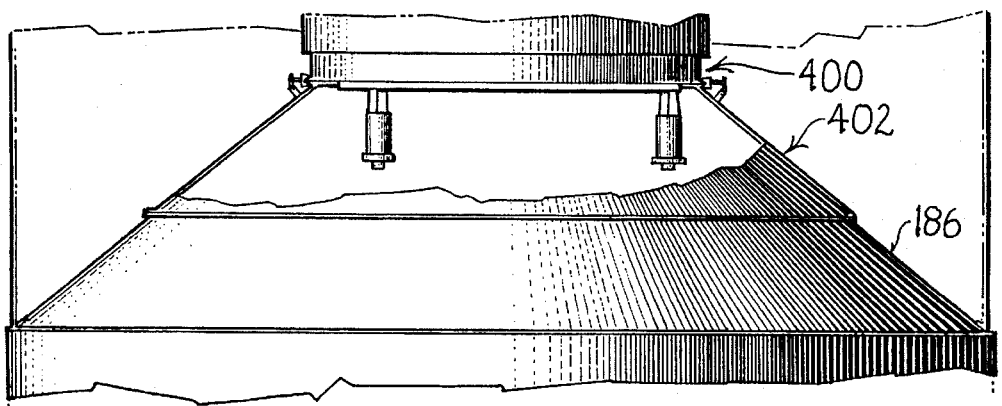
FIG_41
FIG_42A
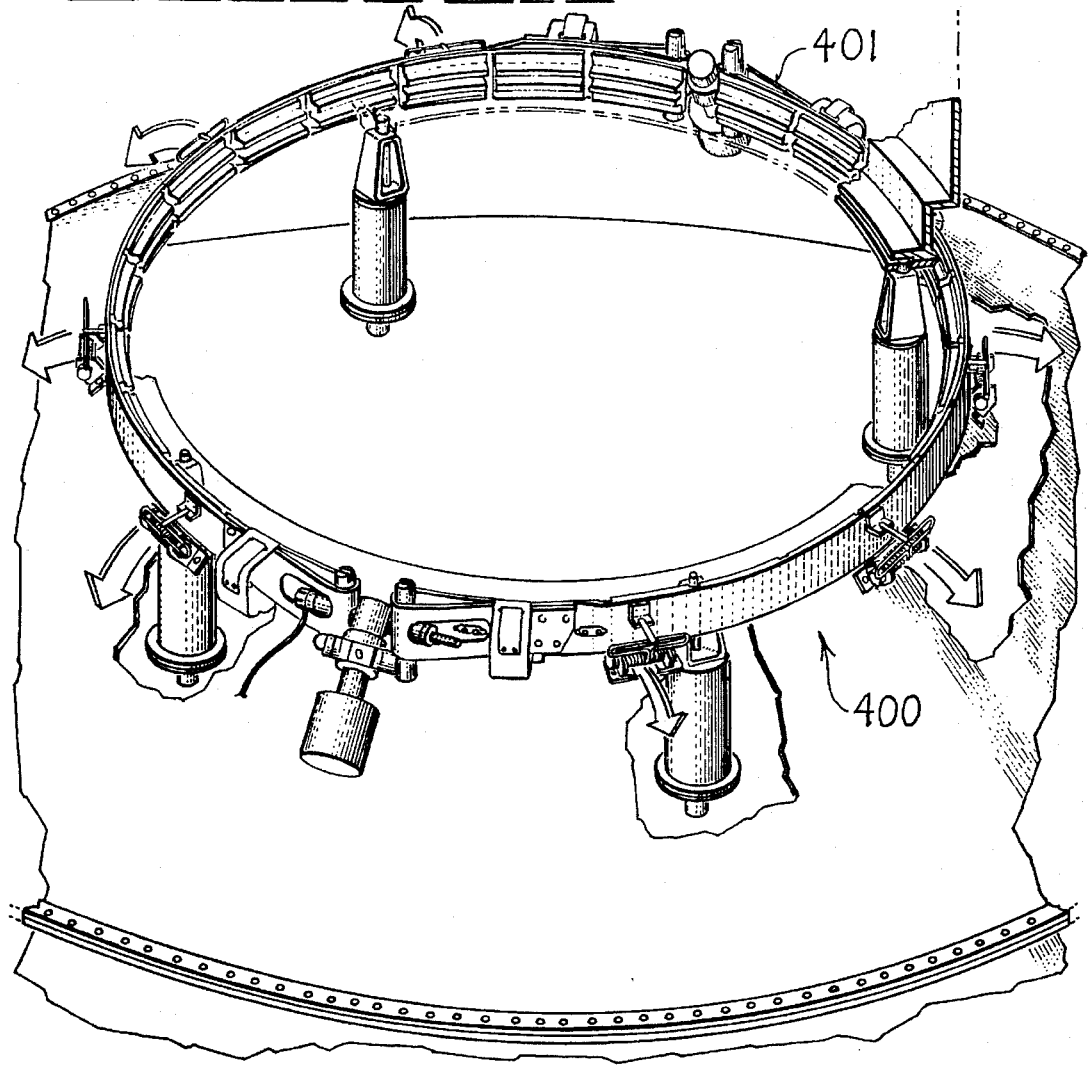

FIG_42B
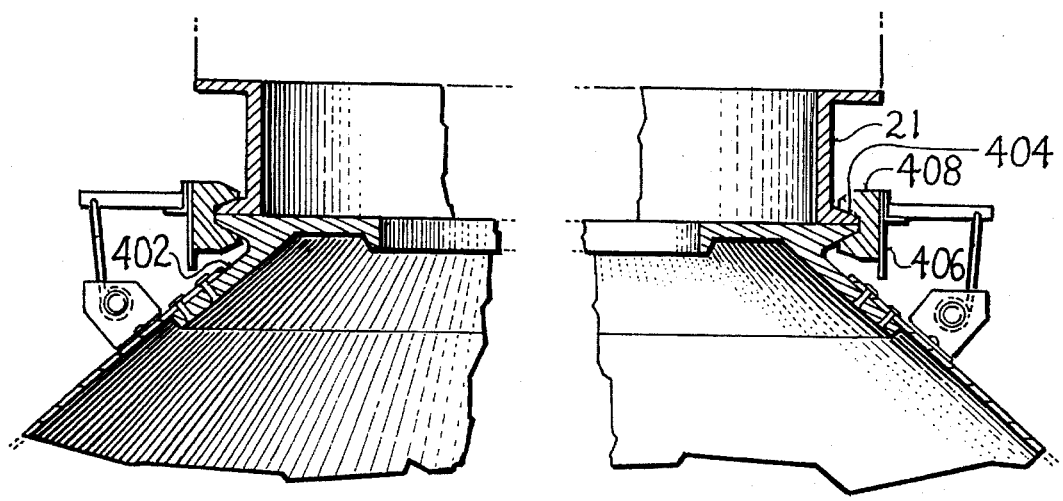
FIG_42C
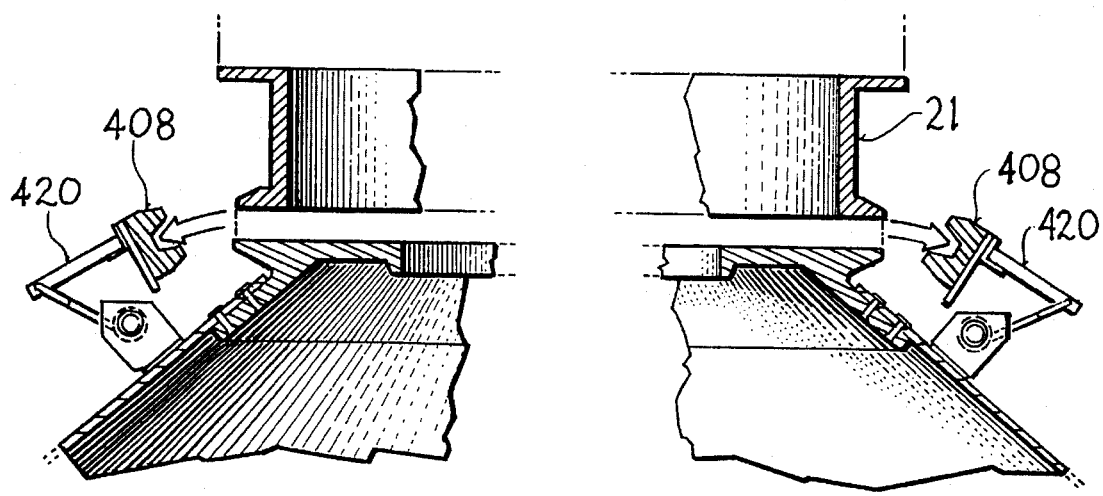
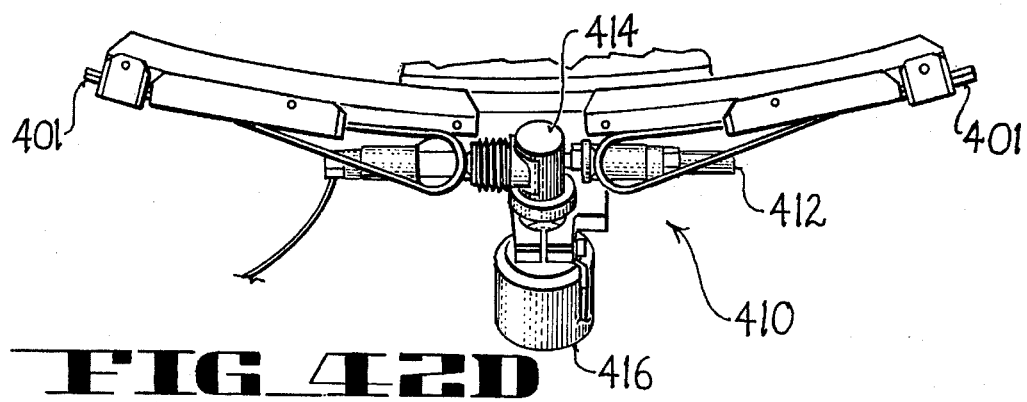
FIG_42D

FIG_42E
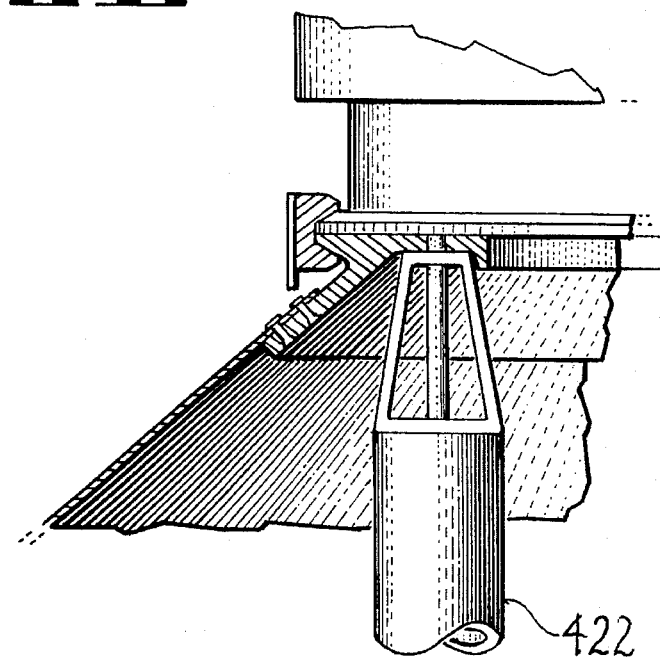
FIG_42F
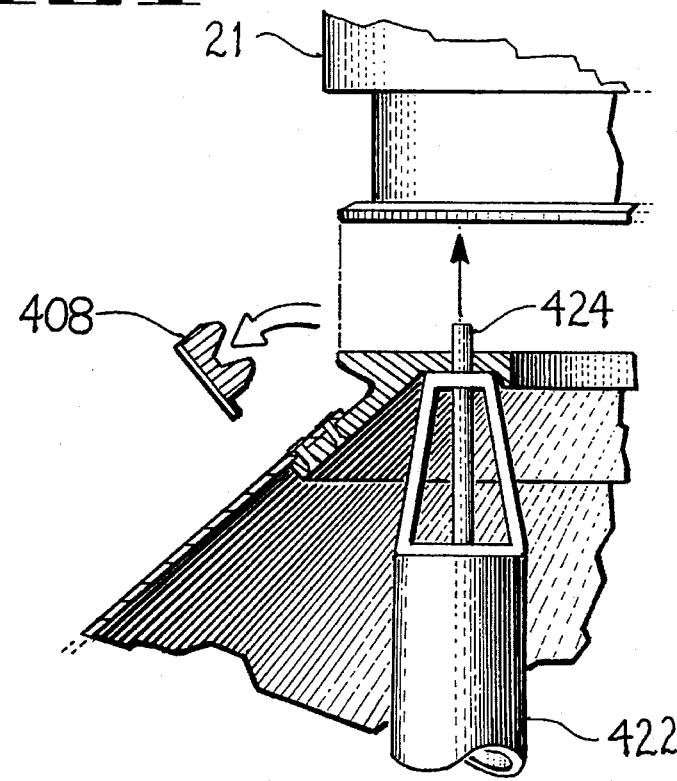

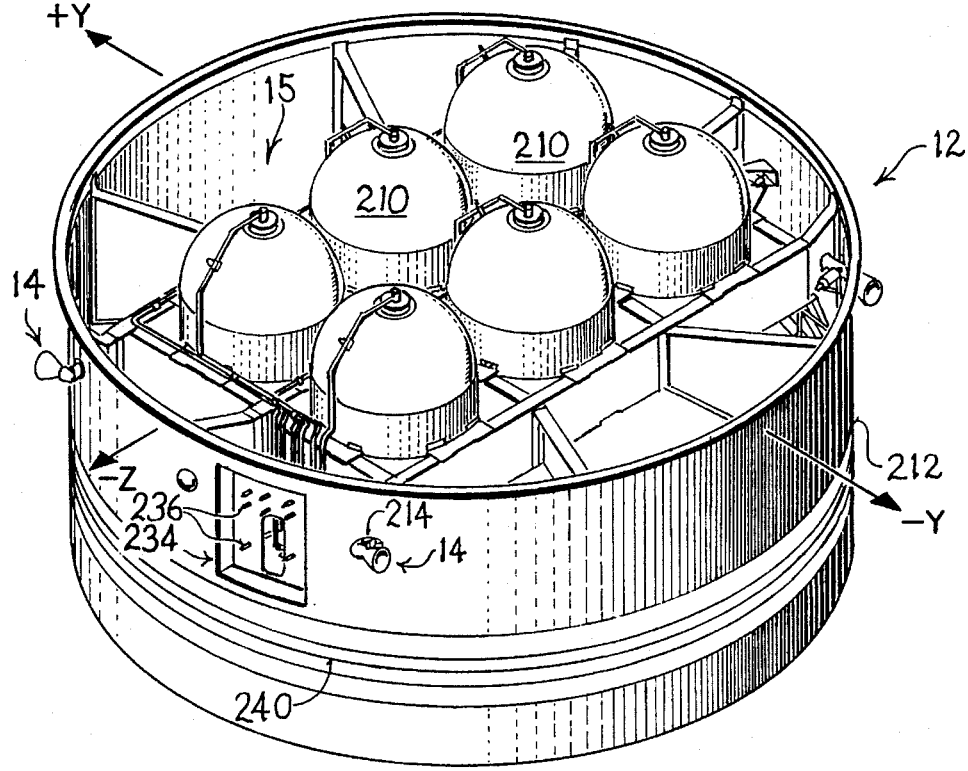
FIG_44
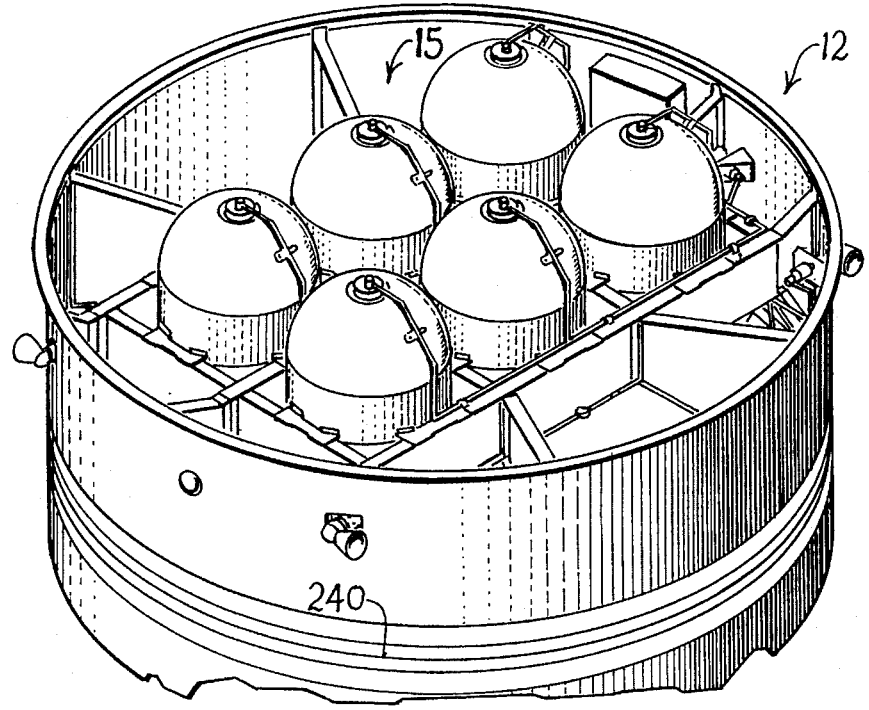
FIG_43

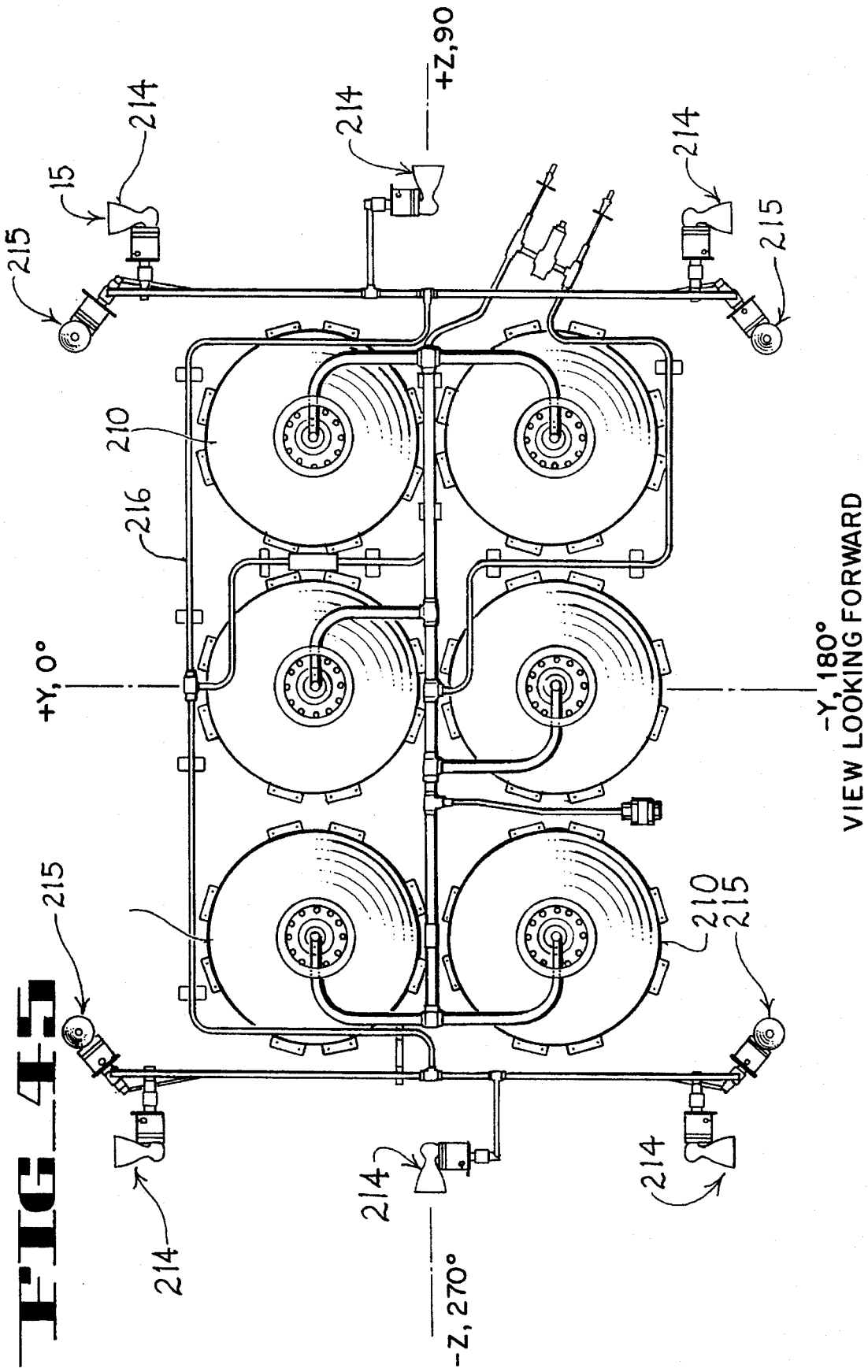

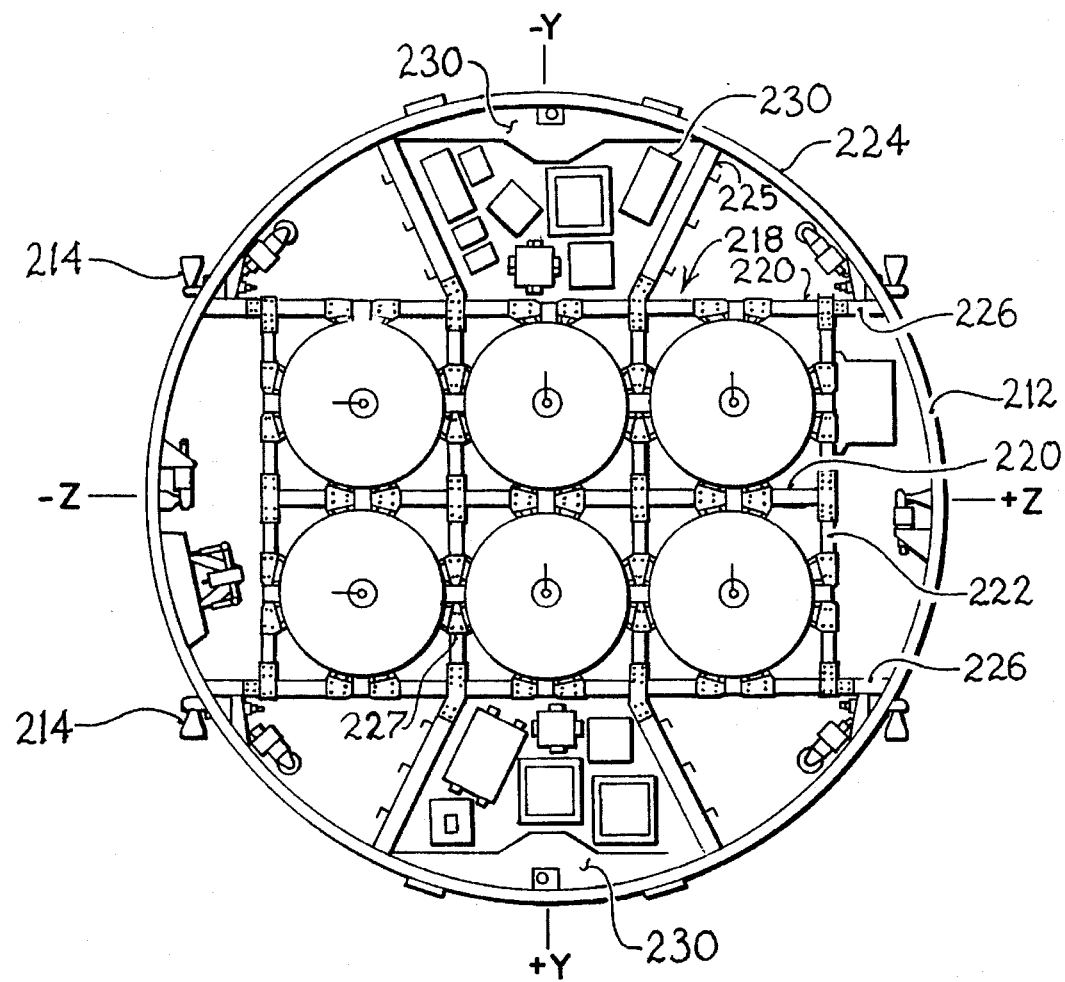
FIG_46
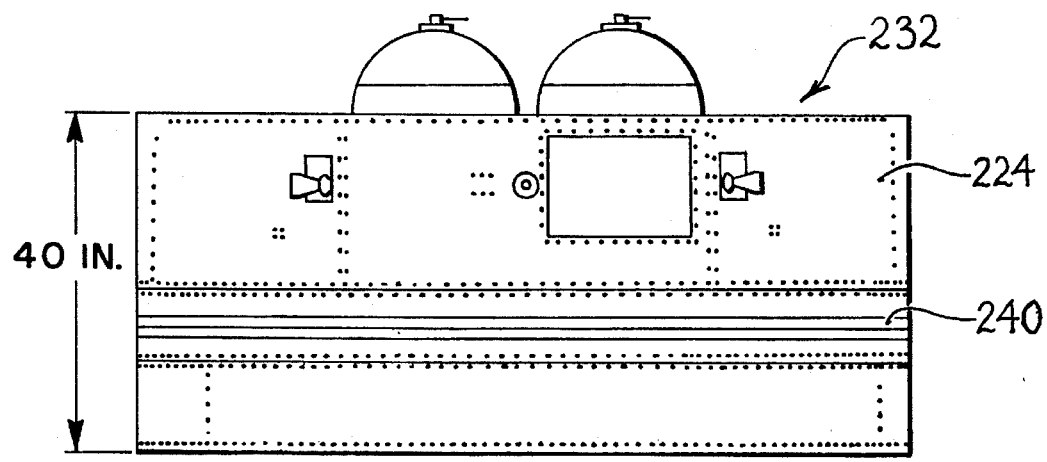
FIG_47

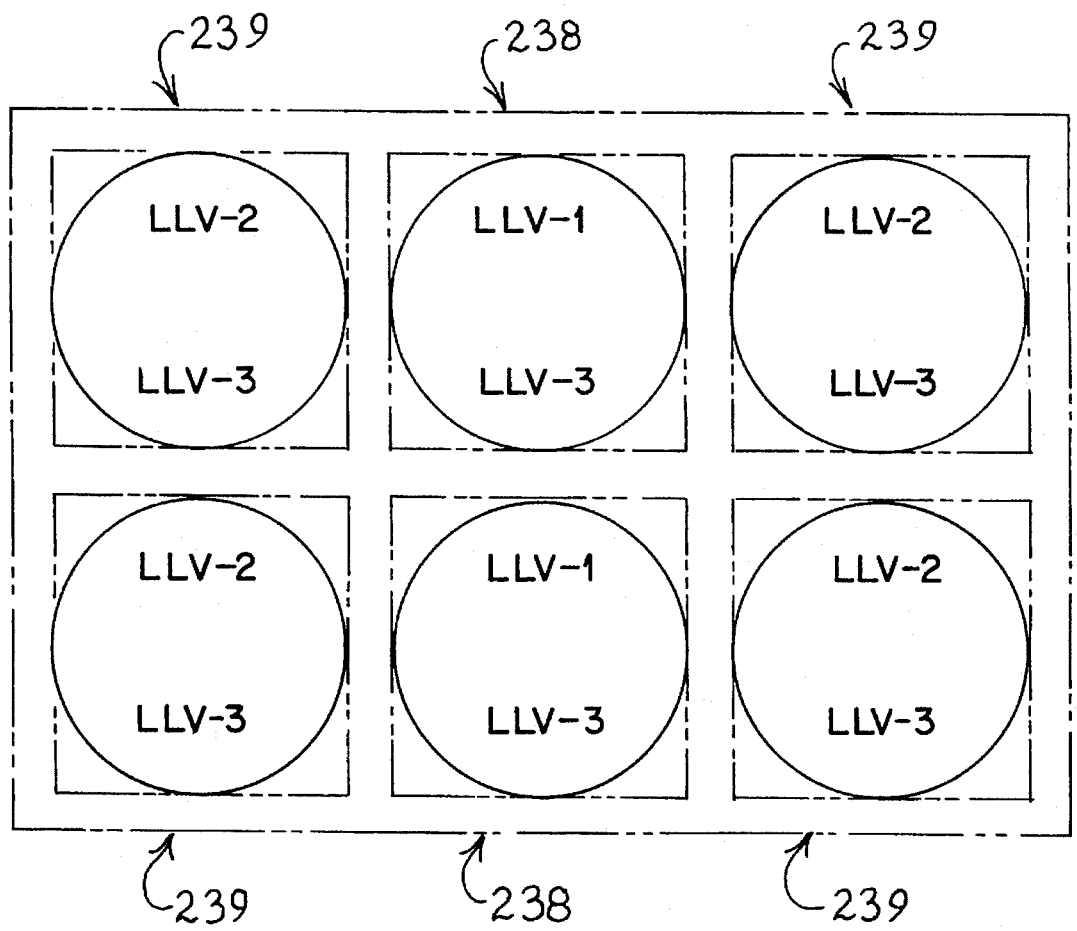
FIG_48

FIG_50
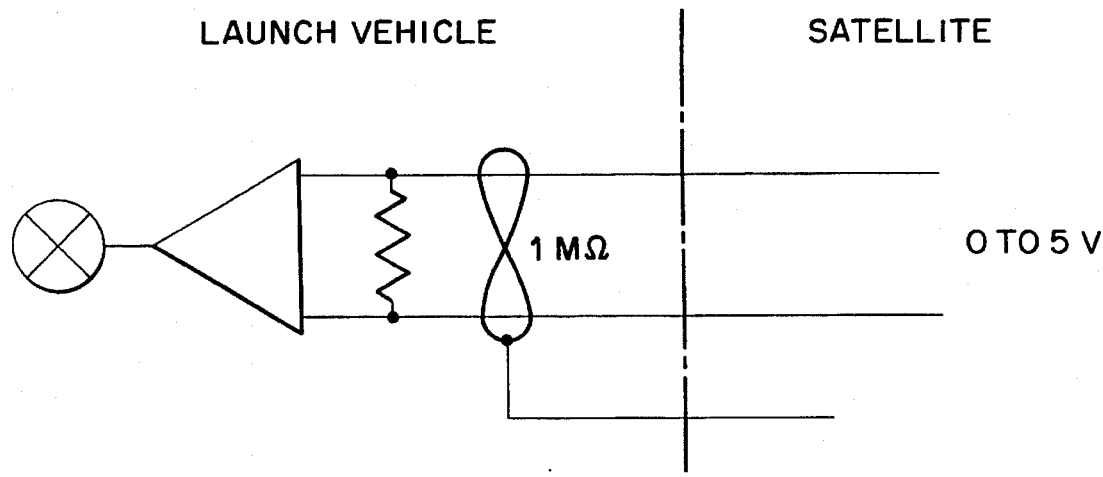
FIG_51
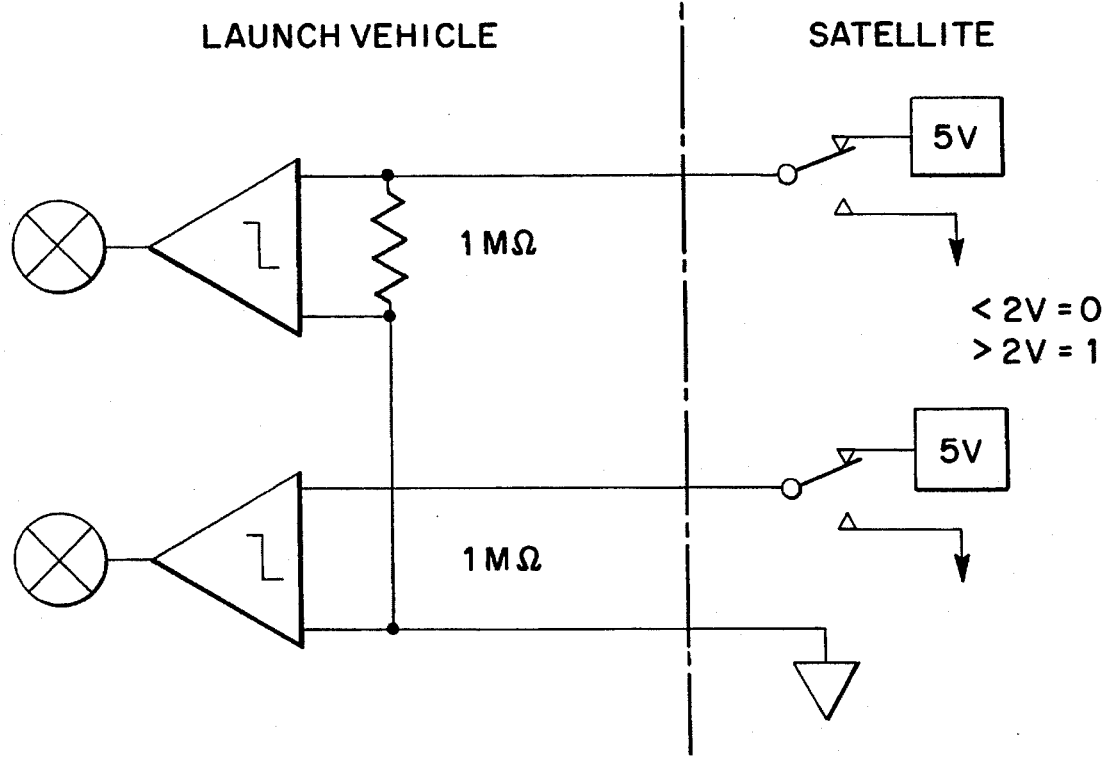

FIG_52
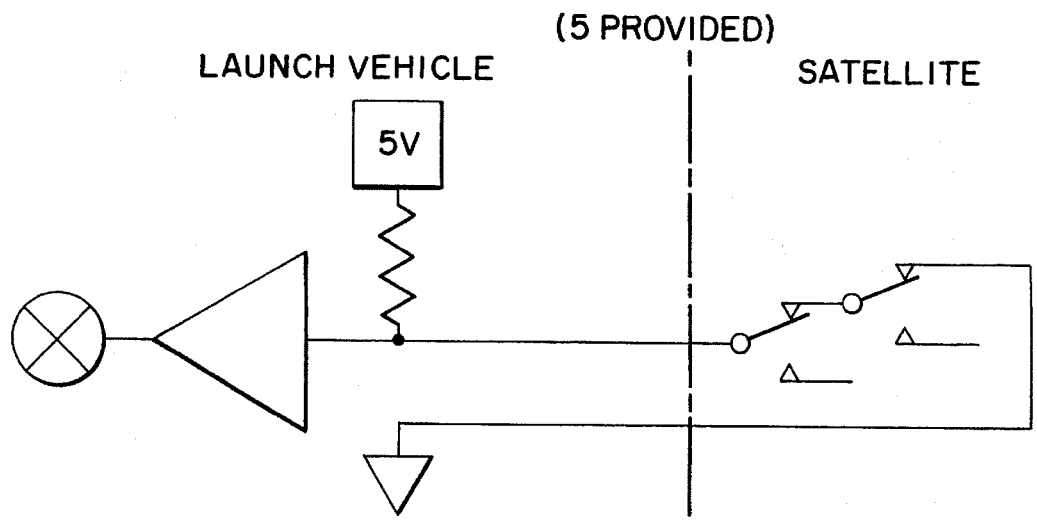
FIG_53
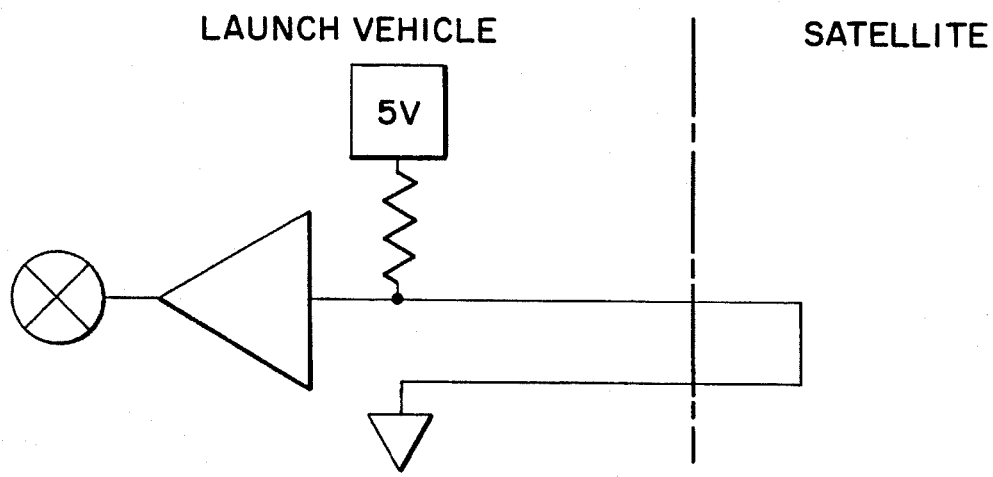
FIG_54
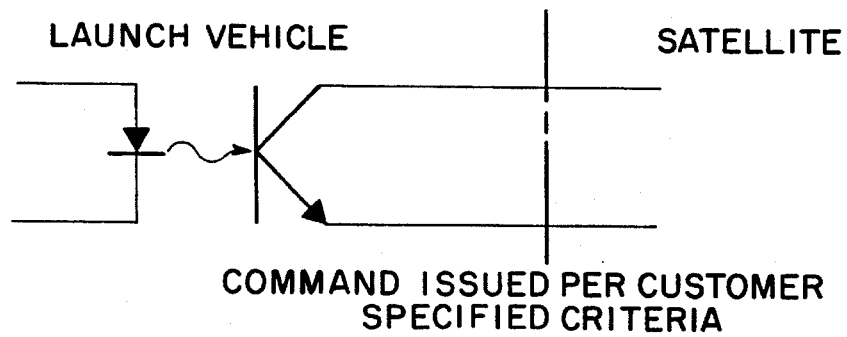
COMMAND ISSUED PER CUSTOMER SPECIFIED CRITERIA

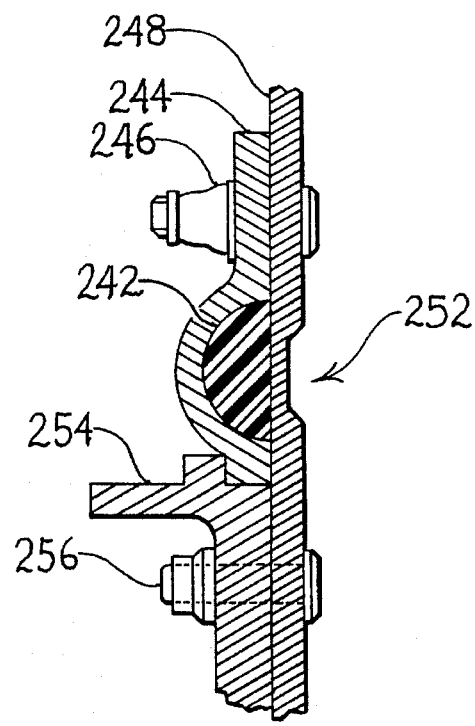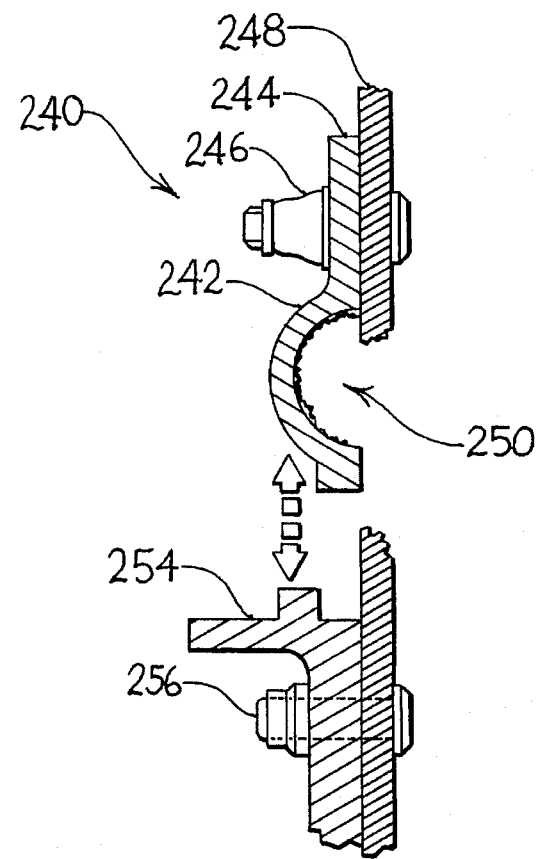

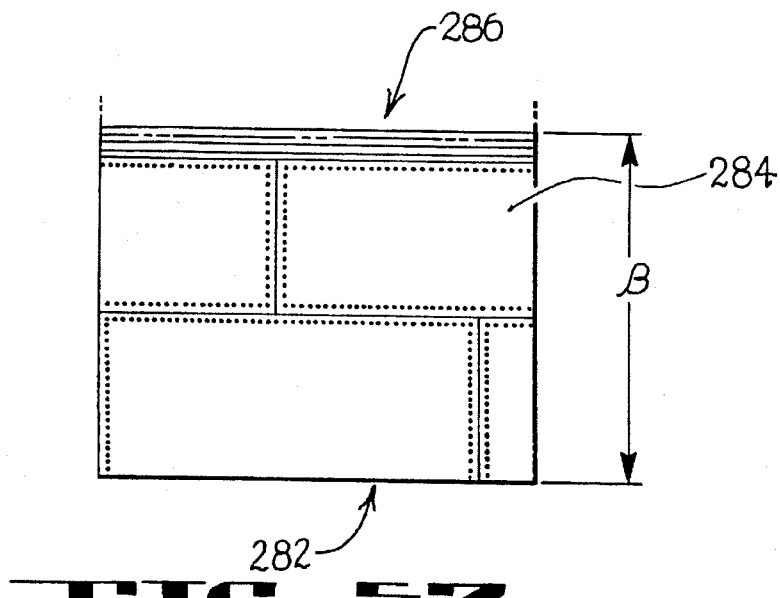
FIG_57
FIG_58
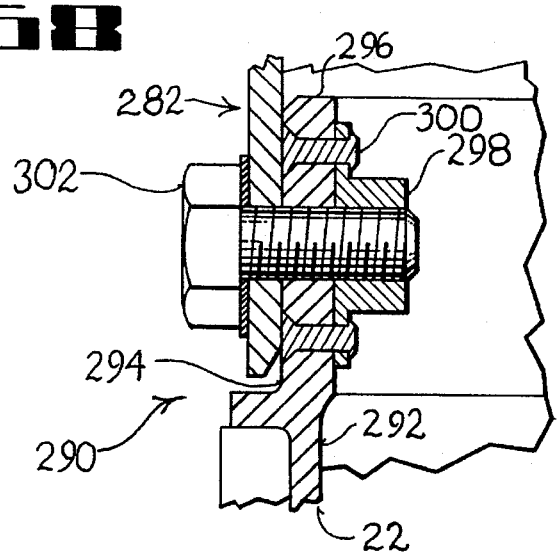
FIG_59
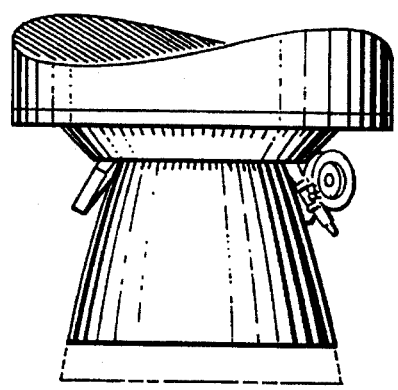

FIG_60   FIG_61
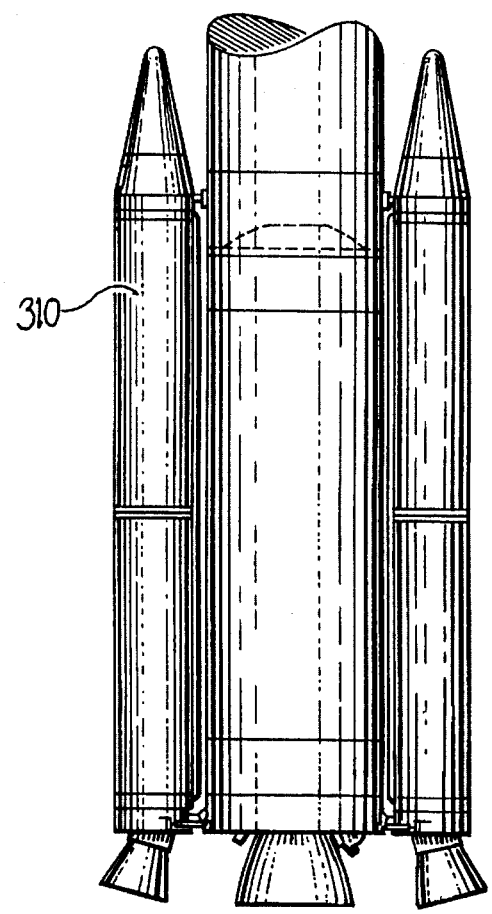
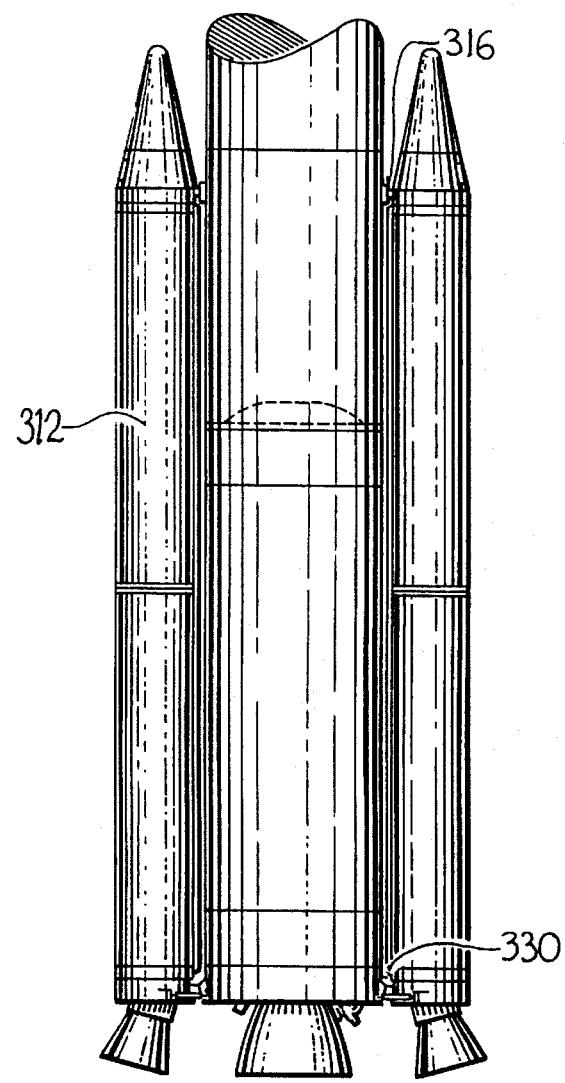

FIG_62
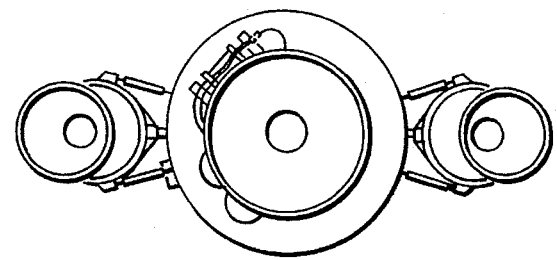
FIG_63
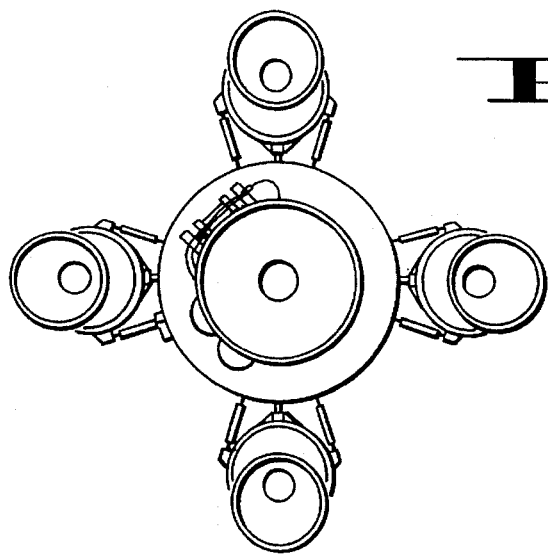
FIG_64
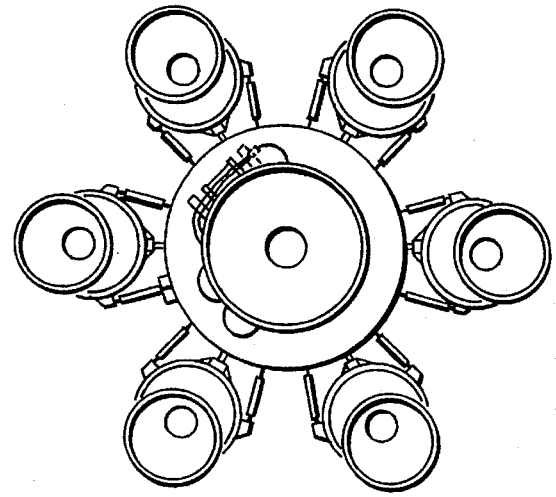

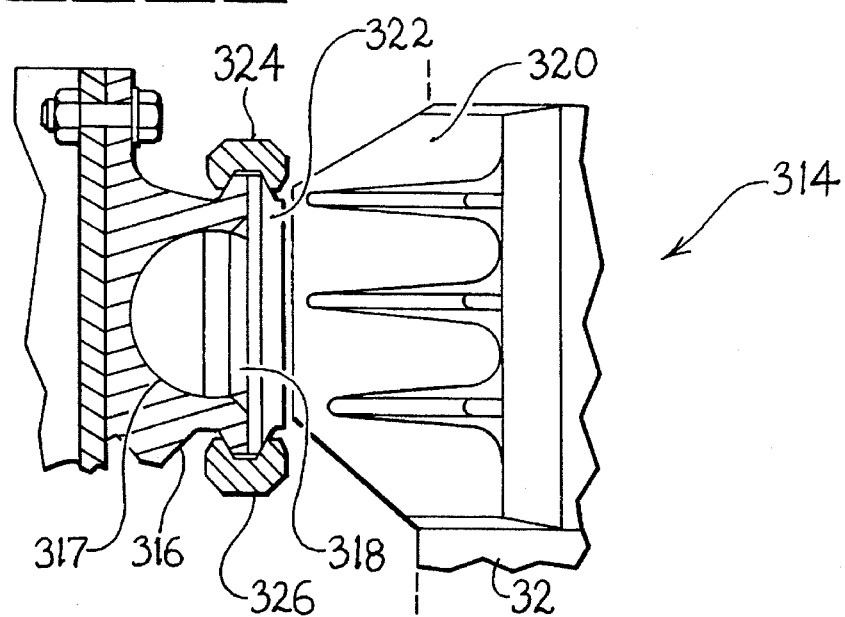
FIG_65
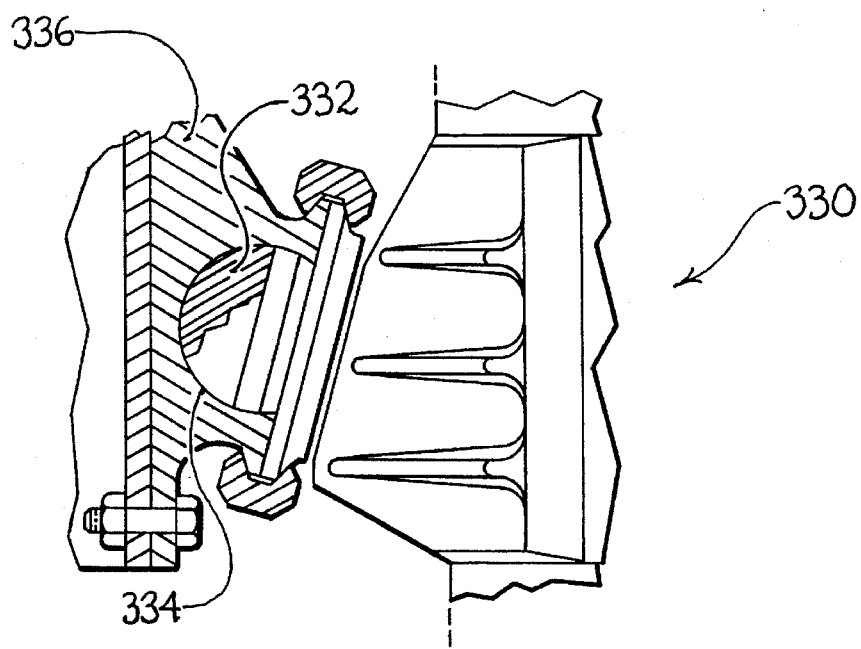
FIG_66

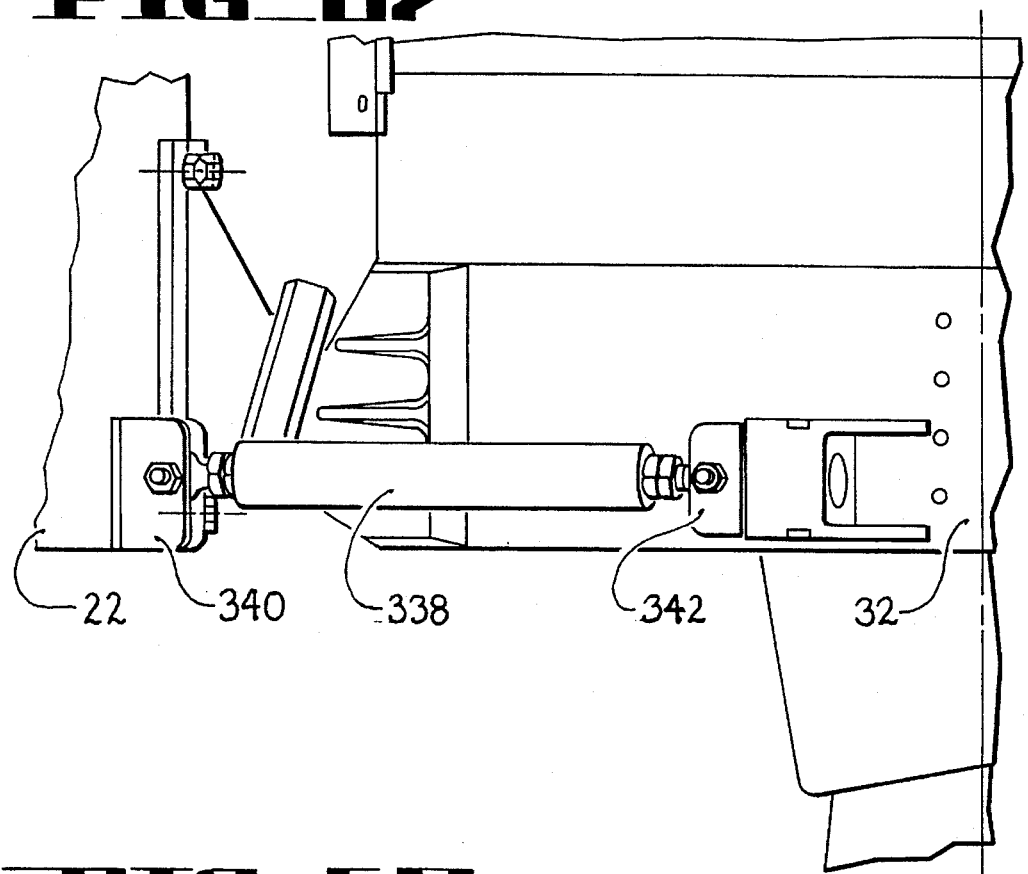
FIG_67
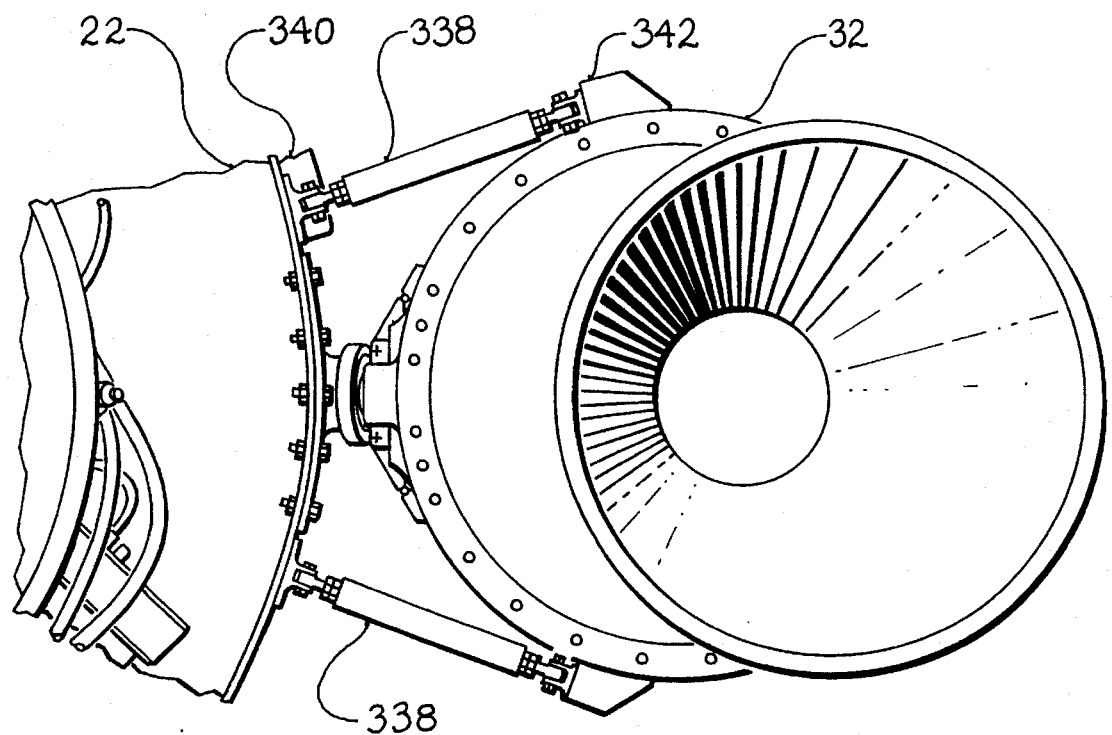
FIG_68

LAUNCH VEHICLE SYSTEM

BACKGROUND OF THE INVENTION

It is well known that most liquid propellants provide higher Isp than do solid propellants, and thus are more energy efficient than solid propellants. Liquid propellant rocket engines can be throttled to control the thrust, and in some applications can be stopped and restarted. However for most space booster applications in the payload class of 500 to 6000 to 20,000 pounds to Low Earth Orbit (LEO), solid rocket motor space boosters can be as reliable and less costly than liquid propellant boosters.

The inherent simplicity of solid rocket motor boosters reduces the processing times and headcount. Liquid propellant boosters inherently require more complex processing procedures resulting in longer processing times and a larger workforce at the launch site. Thus the processing component of cost, for solids, is substantially less.

The U.S. Military became the driving force behind the development of solid propellant missiles. The military requirements were, however, substantially different. They emphasized high performance, quick reaction, simplicity, and safety in operations. There were stringent weight, length, and volume constraints, especially for submarine based missiles.

Likewise, because of the always increasing military requirements for additional performance within weight and dimension constraints, the missile designers were forced to lighter-weight structures, propellants with higher Isp, reducing inerts to increase the mass fraction of the booster stages, and trimming design and manufacturing margins to the minimum. These measures required additional tests during development and production, more inspections, and certainly a proliferation of documentation verifying the work. All at added expense.

On the other hand, these requirements also spawned substantial advances and developments in materials, ever increasing strength to weight ratios. Metal cases were replaced by glass to be replaced by Kevlar in turn to be replaced by graphite-epoxy filament wound cases of ever increasing strength as the technology evolved.

Graphite nozzle throats became carbon-carbon which improved reliability although performance also increased due to reduced throat erosion.

It was recognized that if performance driven requirements such as booster weight and volume constraints could be relaxed, substantial improvements in reliability and lower manufacturing cost could be realized.

It was decided that users' requirements could be met with substantial margin—for spacecraft weight and volume growth during development—by combinations of existing or about to become existing solid rocket motors, and, as an example, using robust aluminum structure for interstages and equipment sections rather than composites.

The approach proposed is to minimize redundant handling. There are three major activities. The first is solid rocket motor receiving at the launch facility; installation of destruct ordnance, and vertical stacking at the launch pad. The payload (spacecraft) which is previously checked out in a standard facility is installed on the equipment section at that facility. Any payload specific consumables (for example hydrazine for spacecraft propulsion) is loaded at this facility. The fairing (shroud) is installed. The complete assembly is transported to the launch pad, and stacked on the booster. This stacking process is limited to electrical connections, and mechanical mate. Environmental conditioning is provided to the spacecraft if required. The objective is to keep as much activity as possible in existing buildings in a shirt sleeve, floor level environment. This approach reduces cost by avoiding expensive gantry features such as a clean room. On-the-launch pad checks before the launch countdown are then limited to verifying connectivity.

BRIEF DESCRIPTION OF THE DRAWINGS

FIG. 1 shows one embodiment of the general rocket system of this invention.

FIG. 2 shows another embodiment of the general rocket system of this invention.

FIG. 3 shows still another embodiment of the general rocket system of this invention.

FIG. 4 shows a portable launch platform from which an embodiment of this invention is being launched.

FIG. 5 shows the stack and shoot payload processing facility of this invention.

FIG. 6 shows the dynamic load requirements for the rocket motor systems of this invention.

FIGS. 7, 8 and 9 show the load profiles for the rocket motor systems of this invention.

FIG. 10 shows the payload capacity at different inclinations for the embodiment of FIG. 1.

FIG. 12 shows the payload capacity at different inclinations for the embodiment of FIG. 3 with six strap-on auxiliary motors.

FIG. 13 shows the fuel saving orbit approach of this invention.

FIG. 14 presents an overview of components of the basic rocket system.

FIG. 15 shows details of the fairing section of the assembly shown in FIG. 14.

FIG. 16 is a schematic drawing of the explosive seam in a fairing.

FIG. 17 is a detailed cross-sectional drawing of the connecting assembly of the fairing.

FIG. 18 shows details of the seam separator couplings.

FIG. 19 shows further details of the seam separator couplings.

FIG. 20 shows the configuration of the cork lining in one fairing of this invention.

FIG. 21 shows the configuration of the cork lining of another fairing of this invention.

FIG. 22 shows the configuration of the cork lining of still another fairing of this invention.

FIG. 25 is view of an opening shroud.

FIG. 26 is a detailed view of the thruster bar assembly before separation.

FIG. 27 is a detailed view of the thruster bar assembly during separation.

FIG. 28 is a detailed view of the spring section, before separation.

FIG. 29 is a detailed view of the spring section during separation.

FIG. 30 is a cross-sectional view of a shroud, showing location of the separator assemblies.

FIG. 31 is a side view of the hinge construction.

FIG. 32 is an isometric view of the hinge construction shown in FIG. 31.

FIG. 33 is a side view of the hinge construction of FIG. 31 during separation.

FIG. 34 is a side view of the LLV 1 assembly with one embodiment of its shroud assembly.

FIG. 35 is a cross-sectional view of the shroud assembly of the LLV 1 assembly of FIG. 34.

FIG. 36 is a side view of the LLV 2 assembly with one embodiment of its shroud assembly FIG. 37 is a side view of the LLV 3 assembly with one embodiment of its shroud assembly FIG. 38 is a side view of a payload adaptor of this invention.

FIG. 39 is a detailed view of an upper bracket of the payload adaptor of FIG. 38.

FIG. 40 is a detailed view of a lower bracket of the payload adaptor of FIG. 38.

FIG. 41 is a side view of a marmon clamping payload adaptor system.

FIG. 42A is an isometric view of the marmon clamping payload adaptor of FIG. 41.

FIG. 42B is a side view of the marmot clamp assembly before separation.

FIG. 42C is a side view of the marmot clamp assembly of FIG. 42B during separation.

FIG. 42D is a detailed view of the separator assembly of the marmot clamp system.

FIG. 42E is a detailed view of the propulsion system for separating the payload before separation.

FIG. 42F is a detailed view of the propulsion system of FIG. 42E during separation of the payload.

FIG. 43 is a prospective view of the Orbital Assist Module (OAM).

FIG. 44 is a prospective view of another side of the OAM shown in FIG. 43.

FIG. 45 is a view of the motor assembly isolated from the OAM support structure.

FIG. 46 is a view of the motor assembly and support structure.

FIG. 47 is a side view of the motor assembly shown in FIG. 46.

FIG. 48 is a schematic view showing the location of tanks for the various LLV systems.

FIG. 50 is an analog telemetry monitor circuit according to this invention.

FIG. 51 is a circuit of the discrete telemetry monitors according to this invention.

FIG. 52 is a circuit of the continuity loops according to this invention.

FIG. 53 is a circuit of the separation indicator according to this invention.

FIG. 54 is a circuit of the command structure according to this invention.

FIG. 55 is a cross-sectional view of the separation joint between the OAM and the motor, FIG. 56 is a cross-sectional view of the separation joint of FIG. 55 during separation.

FIG. 57 is a view of the interstage between the first and second motor stages.

FIG. 58 is a cross-sectional view of the non-separable connector between interstage and the first stage of the motor assembly.

FIG. 59 is a side view of the second stage motor nozzle.

FIG. 60 shows the configuration of the first stage assembly of the LLV 3 assembly with one strap-on motor size.

FIG. 61 shows the configuration of the first stage assembly of the LLV 3 assembly with another strap-on motor size.

FIG. 62 is a bottom view of a strap-on assembly with two strap-on motors.

FIG. 63 is a bottom view of a strap-on assembly with four strap-on motors.

FIG. 64 is a bottom view of a strap-on assembly with six strap-on motors.

FIG. 65 is a side view of an optional, releasable strap-on motor connector.

FIG. 66 is a side view of an alternative embodiment of an optional, releasable strap-on motor connector.

FIG. 67 is a side view of a motor connector assembly of this invention.

FIG. 68 is a bottom view of the motor connector assembly shown in FIG. 67.

DETAILED DESCRIPTION OF THE INVENTION

Figure 11:
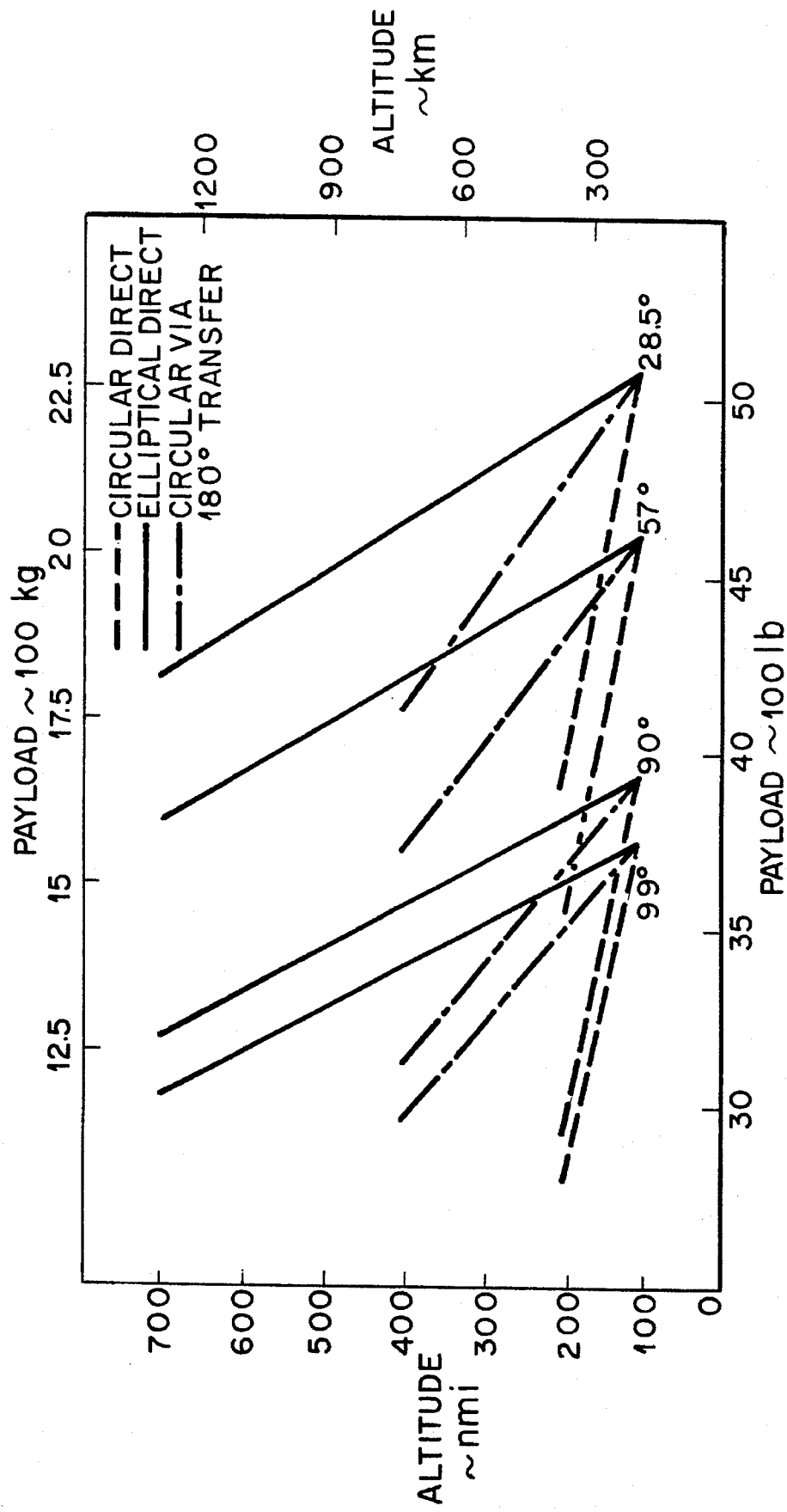
FIG. 11 shows the payload capacity at different inclinations for the embodiment of FIG. 2.

Referring to FIG. 1, a rocket system in accordance with the invention is indicated generally by reference numeral 10 and includes an Orbital Assist Module 12 having an attitude control system 14 with liquid fuel motors 15; solid fuel rocket motors 16 on which the attitude control system is mounted, and a payload assembly 18 which includes a shroud 20 for housing a payload 21.

Such a modular system allows a stack-and-shoot approach to be adopted during assembly. The solid fuel motors 16 are simply secured together to provide a propulsion system suitable to launch the payload in question.

The shroud is, in turn, selected to accommodate the particular payload. As will be described in greater detail below, shrouds having different configurations, are provided. These are adapted to be interchangeably connected to the Orbital Assist Module. In this way the appropriate propulsion system can be combined with the appropriate shroud to meet mass and size parameters of the payload 21.

Referring again to FIG. 1, the solid fuel rocket motors 16 include a first stage primary solid fuel motor 22 which is a 236 centimeter diameter, 889 centimeter long solid fuel rocket motor available from Thiokol under the tradename, Castor 120 GT. It is a 120,000 lbm class motor that employs a graphite epoxy resin case, a class 1.3 HTPB propellent, a pyrogen ignitor, and vectorable carbon-phenolic nozzles driven by a cold gas blow down thrust vector control system.

Various embodiments of the rocket system 10 are shown in FIGS. 1 to 3.

Referring to FIGS. 2 and 3, the first stages 22 are identical to that of the FIG. 1 embodiment and are, accordingly, indicated by the same reference numeral 22. Both the FIGS. 2 and 3 embodiments employ a second stage which also consists of a Thiokol Corporation Castor 120 solid fuel rocket motor. The only distinction between the first stage 22 and the second stage 24 is that the nozzle of the second stage 24 has a larger expansion ratio nozzle to improve performance at higher altitudes. Furthermore, in order to change the burn characteristics, thereby allowing the thrust of the second stage to be tapered near burn-out to lower vehicle acceleration and provide a smoother ride for the payload, the propellent grain is suitably tailored.

The embodiments illustrated in FIGS. 1, 2 and 3, further include an Orbus 21D solid fuel rocket motor which is manufactured by the Chemical Systems Division of United Technologies, Inc. and constitutes the final solid fuel stage 26. As appears from FIG. 1, the final solid fuel stage 26 is mounted on top of the first stage in the FIG. 1 embodiment (which is referred to henceforth as LLV1). In the FIGS. 1 and 2 embodiments, hereafter referred to as LLV2 and LLV3, respectively, the stage 26 is, instead mounted on top of the second stage 24. In all the embodiments, however, the stage 26 is identical, using a carbon phenolic nozzle and an electromechanical actuator.

The embodiment illustrated in FIG. 3 further includes strap-on solid fuel motors 32, being Castor IV A motors, to increase the payload carrying capacity.

It is thus clear that, apart from the attitude control system 12 which includes the liquid fuel motors 15, the propulsion systems of the various embodiments are of a solid fuel variety.

In each of the three embodiments illustrated in FIGS. 1 to 3 the attitude control system is mounted on top of the stage 26 and, in turn, is connected to a shroud, as is discussed in greater detail below. The shroud differs for the three embodiments and is, accordingly, designated by reference numerals 20, 28, 30 for the LLV1, LLV2 and LLV3, respectively. In order to mount the payload in its shroud, a payload adaptor 34 (discussed below), is provided.

There are thus two broad sections to the system 10: the propulsion system, consisting of the solid and liquid fuel motors; and the payload assembly comprising a shroud for housing a payload, and a payload adaptor 34.

As mentioned above, the use of different propulsion systems for the various embodiments provides for different payload carrying capacities. The payload requirements, in turn, account for the different shroud configurations.

The smallest vehicle (LLV1) (illustrated in FIG. 1) will be capable of placing up to 2200 pounds into a low earth orbit (LEO) of 100 nautical miles at 28°. The next increment, (LLV2) (FIG. 2) will be capable of placing 2200 to 4000 pounds into LEO, and the LLV3 can place 4000 to 8000 pounds into LEO, depending upon the number of strap-on motors 32. Strap-on motors 32 are added in quantities of 2, 3, 4 and 6 to provide performance increases of 1400, 660, 600 and 1100 lb, respectively.

The system 10 configuration provides a number of advantages. The use of solid fuel motors, for instance, permits a stack-and-shoot approach to be adopted. When used in conjunction with a mobile launch system checkout van (not shown), launch operations are even possible from a portable launch platform 36 (FIGS. 4). This approach allows the propulsion system and payload assembly to be independently and concurrently assembled, thereafter simply to be mated to each other.

The assembly and checkout of the system 10 at the launch site, based on a simple stack-and-shoot approach, is illustrated in FIG. 5 for a LLV1. The assembly of the propulsion system 16 is shown in the lower half of the illustration and takes place independently of the assembly of the payload assembly 18. The first stage 22 of the propulsion system 16 is mounted on a launch pad, (e.g. a portable platform 36 as illustrated in FIG. 4). An interstage 38, which will be described in greater detail below, is thereafter mounted on top of the first stage 22 to facilitate the mounting of the Orbus 21D final stage 27 on top of the first stage 22. The Orbital Assist Module 12 with its liquid fuel motors 15 is thereafter connected to the leading end 40 of the final stage solid fuel motor 27. The fuel tanks of the liquid fuel motors 15 can be fueled prior to assembly or once assembled. At this point the propulsion system is ready to receive the payload assembly 18. The payload assembly 18, illustrated in the upper half of FIG. 5, is independently and concurrently assembled. The payload 21 is mated to a payload adapter 34 and sealed in the shroud, in a clean room under positive pressure to avoid contamination. The encapsulated payload is then delivered to the pad for mating with the launch vehicle just 3 days before launch. Filtered airconditioning maintains both the temperature and cleanliness of the payload on the pad. The payload assembly 18 and propulsion system 16 are connected to provide the rocket system 10.

Final preparation and check out on the launch pad includes installation of batteries (not shown), destruct arming devices (not shown) and final electrical checks. The time from completion of payload receipt inspection at the launch site to final countdown and launch is as short as two weeks for an LLV1. Clearly the times for the LLV2 and LLV3 will be somewhat longer to take account of the second stage 24 which has to be mounted and any strap-on motors 32.

The stack-and-shoot approach also has the advantage that it allows the user to select a propulsion system that is suited to his particular payload, It allows the user to move up to a slightly larger launch vehicle if a change in mission requirements causes payload weight to grow. This can be accomplished without facing completely new design interfaces and environments caused by moving up to a new class of launch vehicles.

Solid rocket motors thus provide a great deal of operational flexibility. They are ready to launch when the payload is ready. The stack-and-shoot approach minimizes the time spent at the launch site, lowering cost for the launch vehicle as well as the cost of the payload final assembly and check out team. The launch vehicle is ready and waiting on the payload rather than the other way around.

The environments experienced by the payload during flight on a LLV are similar to those of other launch vehicles. Because the LLV design utilizes existing solid rocket motors, the axial static load is larger than for some liquids. It varies depending upon ascent trajectory and payload mass but does not exceed 8 gs. The lateral load maximum of 2.5 gs is below those of winged launch vehicles and is comparable to liquids. The dynamic loads associated with motor ignition and stage separation are below these limits and are not additive to the static load. They occur at times of low acceleration and therefore do not exceed the 8 gs limit when added to the quasi-static acceleration loads. The stiffness required of the satellite and the adaptor interface is 15 Hz for the LLV1 to avoid coupling with the structural modes of the launch vehicle. The requirement for LLV2 and LLV3 will be lower due to the increased vehicle length and are shown in FIG. 6. The load profiles, in turn, are shown in FIGS. 7 to 9 for the LLV1, LLV2 and LLV3, respectively. FIGS. 8 and 9, specifically show the additional profile due to the second stage motor 24.

Two methods for injecting a satellite payload 21 into orbit are available. (1) Direct injection is applicable to low-altitude circular parking orbits and elliptical orbits. This approach may be used when a satellite requires a propulsion capability for other reasons such as station keeping and performance gain if the satellite raises the perigee. (2) The indirect injection profile provides greater mass-to-orbit capability for injection into an operational or higher altitude circular orbit. With this technique, the satellite is injected near perigee of an elliptical orbit with its apogee at the target orbit altitude. When apogee is reached, one-half orbit later, the OAM thrusters 14 are used to raise the perigee circularizing the orbit at the target altitude. The method appropriate for a specific application depends upon the parameters of the final operational orbit and the capabilities of the satellite.

FIG. 10 shows the LLV 1 LEO payload capability to various inclinations, and FIG. 11 shows the effect of adding a second Castor 120™ 24 to make an LLV2. Because payload interfaces and much of the integration effort are common for all configurations, adding the second Castor 120™ 24 or Castor IV A strap-ons 32 gives satellite developers a new option if their payloads 21 increase in weight. For the minimal incremental cost of adding the additional motors, a significant increase in launch vehicle capability is obtained often more cost effectively than a weight reduction program or compromises in satellite capability. Incremental increases of performance continue with the LLV3. FIG. 12 shows the performance of a six strap-on version.

It is clear that, in order to keep the power requirements to a minimum, indirect injection of the satellite 21 into circular orbit is desirable. This fuel saving approach is illustrated in FIG. 13. Using the first stage 22 and, in the case of the FIGS. 2 and 3 embodiments, also the second stage 24 the satellite 21 is propelled to a point 50. In the case of the FIG. 3 embodiment, the strap-on motors 30, of which there may be 2, 3, 4 or 6, supplement the boost provided by the first and second stage primary motors 22, 24. At the point 50, the first stage 22 and, where applicable the second stage 24 and strap-on motors 32 will have been discarded. The remaining portions of the rocket system 10 will then coast from the point 50 to a point 52, at which point the final stage solid fuel motor 27 is ignited to propel the satellite 21 to a point 54 close to its entry into the elliptical orbit 56. The liquid fuel motors 15 of the attitude control system 12 are then used to make final adjustments to bring the satellite 21 into its elliptical orbit 56. It will be appreciated from the illustration that the rocket system 10 is launched at a point and time which allows the entry into the elliptical orbit 56 at a point of perigee, thereby minimizing the fuel required. Once in its elliptical orbit, the satellite 21 is allowed to travel to a point 58, at which point the liquid fuel motors 15 are once again activated to propel the satellite 46 out of its elliptical orbit 56 and into a circular orbit 60.

It will be appreciated that this method allows fuel consumption to be reduced to a minimum. Furthermore, since the solid fuel rocket motors cannot be turned on and off as is the case with liquid fuel motors, a liquid fuel motor, in this case the motors 15 are required to make final adjustments. The solid fuel motors are, in turn, designed to burn out before reaching the elliptical orbit 56.

Each part of the rocket system 10 will now be described in greater detail.

FIG. 14 gives an overview of the various components making up the rocket system 10, which are shown here in a dismantled state for purposes of clarity. In particular, FIG. 14 shows the propulsion system 16, comprising a first stage 22, a strap-on motor 32, a final stage solid fuel motor 27, the interstage 38 and a connecting ring 62. The illustration further shows the fairing or shroud 20, the payload adapter 34 and the Orbital Assist Module 12 with its liquid fuel motors 15.

Three LLV fairings, ranging from the 92-inch-diameter fairing 20, intended primarily for the LLV1 (FIG. 1 ), to the 141 inch fairing 30 (FIG. 3) for the larger vehicles are proposed. While the small fairing 20 can be used on all configurations, it has been determined that the LLV1 is not suited for the larger fairings 26, 30 for aerodynamic reasons. The large volumes of these fairings, however, have the advantage that satellite packaging requirements for deployables such as solar arrays and antennas is simplified. The larger sizes can enclose a satellite as large as a STAR 63, enabling various configurations, capable of GTO or interplanetary missions. The increased weight and drag of the larger fairings, however, results in a small performance penalty. It is therefore desirable to choose the smallest fairing that will enclose a satellite.

The fairings 20, 26, 30 (FIGS. 14 and 15) are defined by walls 72 made of 0.16 inch thick aluminum. The walls 72 are in the form of a two piece clam shell design connected by means of a zip-like explosive seam 70 which separates the two pieces from each other and from the rest of the system 10, when activated. As is described in greater detail below, springs 73 located at the fairing base 74 provide appropriate separation forces by pushing vertically to cause rotation about hinges 76 located at the fairing base 74. This minimizes the breathing mode at separation, a characteristic of two piece clamshells. The fairings are further equipped with access doors (not shown) and RF windows (not shown) located in accordance with the satellite requirements.

Referring now specifically to FIG. 15 the fairing design and its separation will be described in detail with reference to the LLV1 embodiment.

The shroud 20 comprises two clam-like sections 114, 116. The zip-like explosive seam 70 extends vertically along opposite sides of the shroud wall 72 between the sections 114, 116 and circumferentially near the base 74 of the shroud 20. Near the leading end 77 of the shroud or fairing 20, the vertically extending explosive seams 70 are terminated. A seal extends between the upper ends 78 of the seams 70 to seal the gap between the sections 114, 116.

Referring to FIG. 16 the schematic cross-sectional representation of the fairing 20 shows the configuration of the explosive seam 70. Considering FIG. 17, the seam 70 comprises elongate housings, each in the form of opposite plates 84 having longitudinally extending scoring lines 85. The plates 84 are spaced from one another by means of separation brackets 86. Bolts 88 extend through aligned holes in the plates 84 and the brackets 86, and are secured by means of internal nuts 90. The brackets 86 extend outwardly in the form of longitudinally extending flange formations 92 which permit the brackets 86 to be secured to complimentary brackets 94. The brackets 94 are, in turn, bolted to the shroud wall 72 by means of bolts 96. As is illustrated in FIG. 17, the flange formations 92 abut complimentary, inwardly extending portions of the brackets 94. The flange formations 92 and the brackets 94 are provided with complimentary aligned holes, thereby allowing the brackets 86 to be secured to the brackets 94 by means of bolts 100 and nuts 102. Intermediate the inner ends of the brackets 86 and the inner surfaces of the plates 84, a channel-like housing 104 is defined, in which is housed a deformable tube 105 containing an explosive material 106 in the form of a cord. A second pair of brackets 108 is also secured to the brackets 86 by means of the bolts 100 and nuts 102. The plates 108 overlap one another and are frangibly secured to each other to shield the inner plates 84 prior to detonation of the explosive material 106, as will be explained in greater detail below. Referring again to FIG. 16, the explosive material 106 extends longitudinally along the seams 70 as an explosive cord within the tube 105. The tube 105 is formed in sections 109 which are joined by connectors 110. As is shown in FIG. 16, a tube section 112 crosses over to join the two termination points of the explosive seam 70. Referring to FIG. 15, detonators 111 serve to detonate the circumferential seam. Detonators 113 (one shown) detonate the longitudinal seams.

When the explosive material 106 is detonated the deformable tube 105 expands outwardly to exert rupturing forces on the plates 84 causing the plates 84 to rupture thereby permitting separation of opposite sections 114, 116 of the shroud 20. The frangible connections between the plates 108, rupture due to the forces exerted by the explosion, thereby allowing the sections 114, 116 to separate under the action of the thrustor springs 73, and assist springs 160, as is described in greater detail below.

The connectors 110 of the explosive seam 70, are illustrated in greater detail in FIGS. 18 and 19. The couplings 110, at the point of crossover 78, are secured to the wall 72 by means of brackets 117, thereby ensuring that the electrical connector is firmly secured at the opposite crossover points 78. The tube 112 is provided with a seal (not shown) at the point 120 where it leaves the confines of the channel-like housing 104 to cross over to the opposite explosive seam 70. As is also illustrated in FIG. 20, the outer surface of the wall 72 at the upper portion of the fairings 20, is covered by an insulating cork lining 122 which thermally protects the fairing 20. The configuration of the cork lining is illustrated in FIGS. 20, 21 and 22 for the LLV1, LLV2, LLV3, respectively, and is indicated by reference numerals 122, 123 and 124, respectively. It has a thickness of 0.16 inches.

Means for assisting in the removal of the shroud sections 114, 116 are shown in FIGS. 23 to 27 and FIGS. 29 to 30.

Figure 23:
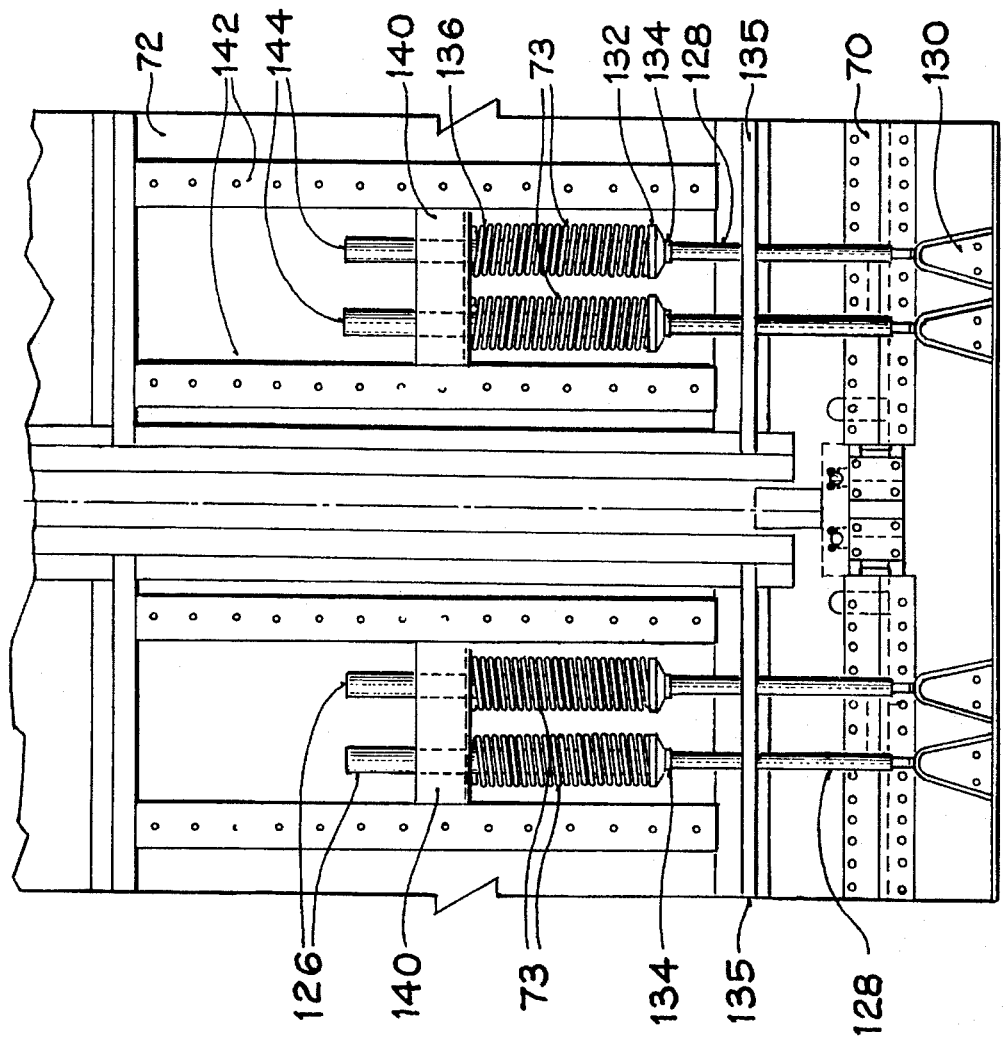
FIG. 23 shows the thruster spring assembly of the shroud assembly of this invention.
Figure 24:
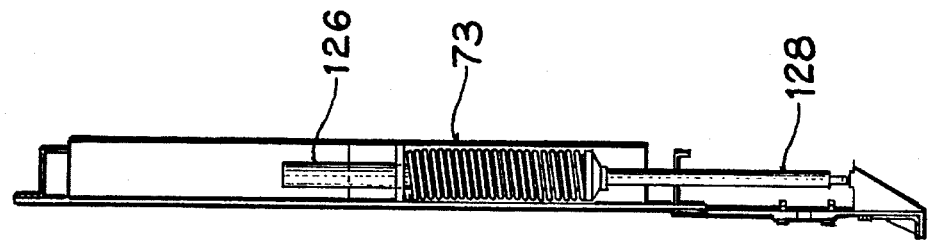
FIG. 24 is a side view of the thruster springs of FIG. 23.

Once the explosion has taken place, thrustor springs 73, illustrated in FIGS. 23 and 24 assist in separating the sections 114, 116. The springs 73 are provided with thrustor bars 128 extending from operatively lower portions of the springs 73 to engage with brackets 130. The lower ends 132 of the springs 73 are immovably held relative to the bars 128 by means of stop formations 134 and the bars 128 are immovably mounted to the shroud 20 by means of brackets 135. The upper ends 136 of the springs 73 engage brackets 140 which are secured to the walls 72 by means of attachment plates 142. Support rods 144, slidably mounted relative to the brackets 140, serve to support the springs 73 and allow the brackets 140 to move up on the rods 144. The location of the springs 73 is schematically represented by reference numeral 146 on FIG. 25. It will be appreciated that the thrustor bars 128 bridge the circumferential junction of the circumferentially extending seam 70. Thus, when the explosion occurs and the seams 70 rupture, the force of the compression springs 73 propels the sections 114, 116 upwardly due to the force of the springs 73 acting between the brackets 140 and the brackets 130. The thrusting action is illustrated in greater detail on FIGS. 26 and 27. The thrustor bars 128 are provided with a concave depression on their lower surfaces 150. The depressions engage complimentary convex-headed bolts retained in the brackets 130. This ensures that no slipping occurs between the bars 128 and the brackets 130 when the springs 73 propel the sections 114, 116 upwardly.

Referring to FIGS. 25 and 28, hinges 76 secure the lower ends of the two sections 114, 116 at four points. These hinges 76 bridge the gap between the shroud portions on either side of the circumferentially extending seam 70. Thus, when the springs 73 propel the two sections 114 and 116 upwardly the halves 114, 116 rotate about the pivotal axes of the hinges, causing them to flip open in the manner illustrated in FIG. 25. The pivotal outward movement of the two halves 114, 116 is assisted by means of assistor springs 160 illustrated in FIGS. 29 and 30. The assistor springs 160 are located at the upper ends of the vertically extending seams 70, at opposite sides of the shroud 20, as indicated by reference numeral 162 on FIG. 25 (only one location is visible). These are compression springs which propel the two sections 114, 116 apart once the seams 70 have ruptured.

The hinges 76 are shown in greater detail in FIGS. 31 to 33. Each hinge 76 comprises a lower bracket 164 engageable with an upper bracket 166. The brackets 164, 166 are pivotable relative to one another about a pivot point defined by a bolt 168 (FIG. 31). The upper bracket 166 engages the bolt 168 by means of an open-ended slot 170 and is retained relative to the slot while in its unactivated state, by means of a retaining bolt 172. The bolt 172, in turn, engages an open ended slot 174 on the lower bracket 164. Thus as the upper bracket 166 pivots in an anticlockwise direction relative to the lower bracket 164 the bolt 172 disengages from the slot 174, allowing the brackets 164, 166 to be parted from one another as illustrated in FIG. 30.

An overview of the LLV1 with its shroud 20 is illustrated in FIGS. 34 and 35. FIG. 35 specifically, shows the configuration of the seam 70 and the scored line 80 to define the two sections 114, 116.

The different shrouds 20, 26 and 30 of the LLV1, LLV2 and LLV3 are illustrated in FIGS. 34, 36 and 37, respectively. Although the above description relates specifically to the LLVI embodiment, the description holds also for the other two embodiments. In each case the shroud tapers towards a rounded apex 180, thereby to optimize the aerodynamics of the rocket system 10.

In order to be able to support the payload 21, irrespective of the nature of the payload 21, a payload adaptor 34, illustrated in FIG. 38, is provided. The payload adaptor 34 consists of a frusto-conical support 186 to which are secured lower annular brackets 188 and upper annular brackets 190. The brackets 188 and 190, are illustrated in greater detail in FIGS. 39 and 40, respectively. The lower bracket 188 defines a base 192 and an upwardly extending arm 194. The base 192 is provided with holes 193, thereby permitting the bracket 188 to be secured to the attitude control system (FIG. 14) by means of bolts (not shown). The arm 194 is, in turn, secured by means of bolts 196 to the support 186.

The bracket 190 takes the form of an angled T-section in cross-section. The downwardly extending body 198 of the T is secured by means of bolts 200 to the support 186. The outer arm 202 of the bracket 190 is provided with vertically extending holes 221 for securing the payload to the bracket 190 by means of bolts (not shown). The frusto-conical support 186 reduces the 92 inch diameter of the equipment section, defined by the orbital assist module 12, to a 66 inch bolt circle. This interface is compatible with existing payload adapters and separation mechanisms which several satellite manufacturers have developed for use with other systems. For smaller satellites, the cone can be extended to reduce the diameter to be compatible with the 38.8 inch marmon clamp system illustrated in FIGS. 41, 42A, 42B, 42C, 42D, 42E and 42F.

The clamp 400 includes an annular spring steal structure 401 and is secured to a frusto-conical support 402 which is secured to a leading end of the frusto-conical support 186 as illustrated in FIG. 41. Looking at FIGS. 42B and 42C it can seen that the payload 21 is provided with a lower annular flanges 404 which abuts a complimentary flange 406 on the upper end of the cone 402. The flange 404 and 406 are held together by brackets 408 having a complimentary inner recess, to matingly receive the flanges 404, 406. The brackets 408 are secured to an inner surface of the annular spring steal formation 401. Referring to FIG. 42A, the spring steel member 401 is formed in two sections joined at opposite ends by means of a connector assembly 410 illustrated in greater detail in FIG. 42D. A sheerable bolt 412 extends between looped ends of the spring steel sections. An explosive chisel 414 is mounted over the pin 412 and is propelled by means of an explosive charge housed in a housing 416 thereby sheering the bolt 412, when activated. This releases the spring steel sections 401. The sections 401 are biased outwardly and, accordingly the brackets 408 move outwardly on hinged members 420 as illustrated in FIG. 42C, thereby releasing the payload 21.

Referring to FIGS. 42E and 42F, propulsion means 422 are illustrated which include a piston rod 424 which is biased upwardly by means of suitable force exerting means e.g. a spring or hydraulic mechanism. Thus when the brackets 408 are removed, the payload 21 is propelled upwardly by the rods 424.

Referring now to FIGS. 43 to 48, the Orbital Assist Module (OAM) 12 is illustrated in greater detail. It is located above the Orbus 21D 27 (FIGS. 3 to 5) and contains the LLV Flight Electronics, Batteries, Telemetry, Inertial Measurement Unit, and the Attitude Control System (ACS) 14 having liquid fuel motors 15. The ACS 14 is a liquid monopropellant hydrazine propulsion system which has 10 rocket engine assemblies for pitch, roll, yaw control and velocity addition to correct for any errors induced during solid rocket motor boost flight. The ACS 14 may be configured with 2, 4 or 6 hydrazine tanks so that the propellant load may be tailored to the specific mission. Fuel load with the modular tanks is 260, 520, and 780 pounds. The ACS 14 is manufactured by the Rocket Research Company which provides four 50 lbf axial thrusters for velocity addition and six 25 lbf thrusters for pitch, yaw and roll control. The hydrazine tanks 210 which are spun aluminum with a graphite composite overwrap, are each pressurized with gaseous nitrogen to 460 psig and contain an AF-105 elastomeric bladder for positive expulsion of the fuel, i.e. to provide for ullage control. The ACS 14 may use up to 98% of the fuel on board at an average specific impulse of 220 seconds. The total impulse available is 57,200 lbf sec.

Referring specifically to FIGS. 43 and 44, the Orbital Assist Module 12 comprises a cylindrical support structure 212 which will be described in greater detail below, and a set of 10 liquid fuel motors 15. The motors 15 are defined by six nozzles 214 for pitch, roll and yarn control and four nozzles 215 for thrust along the longitudinal axis of the system 10. The nozzles 214, 215 are connected to a set of six hydrazine tanks 210. The motor 14 configuration is illustrated more clearly in FIG. 45 which shows the six tanks 210 disposed in two rows of three tanks each of which are interconnected, and connected to the nozzles 214 by means of pipes 216 secured to trailing ends of the tanks 210.

The cylindrical support structure 212, when viewed from the top, shows a set of support brackets 218 which form a rectangular support base of longitudinally extending brackets 220 and transversely extending brackets 221. The brackets 220, 221 are connected by means of horizontally extending plates 222 and vertically extending plates 223. The bracket system 218 is, in turn, secured to an inner surface of a cylindrical outer wall 224 by means of radially extending brackets 225 and extensions 226 of the longitudinally extending brackets 220. Each tank 210 is supported by eight support plates 227 having concave inner edges, complementarily to engage the outer surface of the tank 210. The plates 222, 223 and 227 are secured by means of rivets.

Avionic bay areas 230 are defined intermediate the radially extending brackets 226 as illustrated in FIG. 46.

Viewed from the side (FIG. 47), it is clear that the tanks 210 extend above an upper edge 232 of the cylindrical outer wall 224.

Referring again to FIG. 44, the tanks 210 are serviced from a service valve panel 234 which provides valves 236 connected to leading ends of the tanks 210.

FIG. 48 illustrates the tank layout for the various rocket system embodiments. In the case of the LLV1 the pair of tanks 238 is used; in the LLV2 two pairs of tanks 239 are used; and in the LLV3 all six tanks 238, 239 are used.

Figure 49:
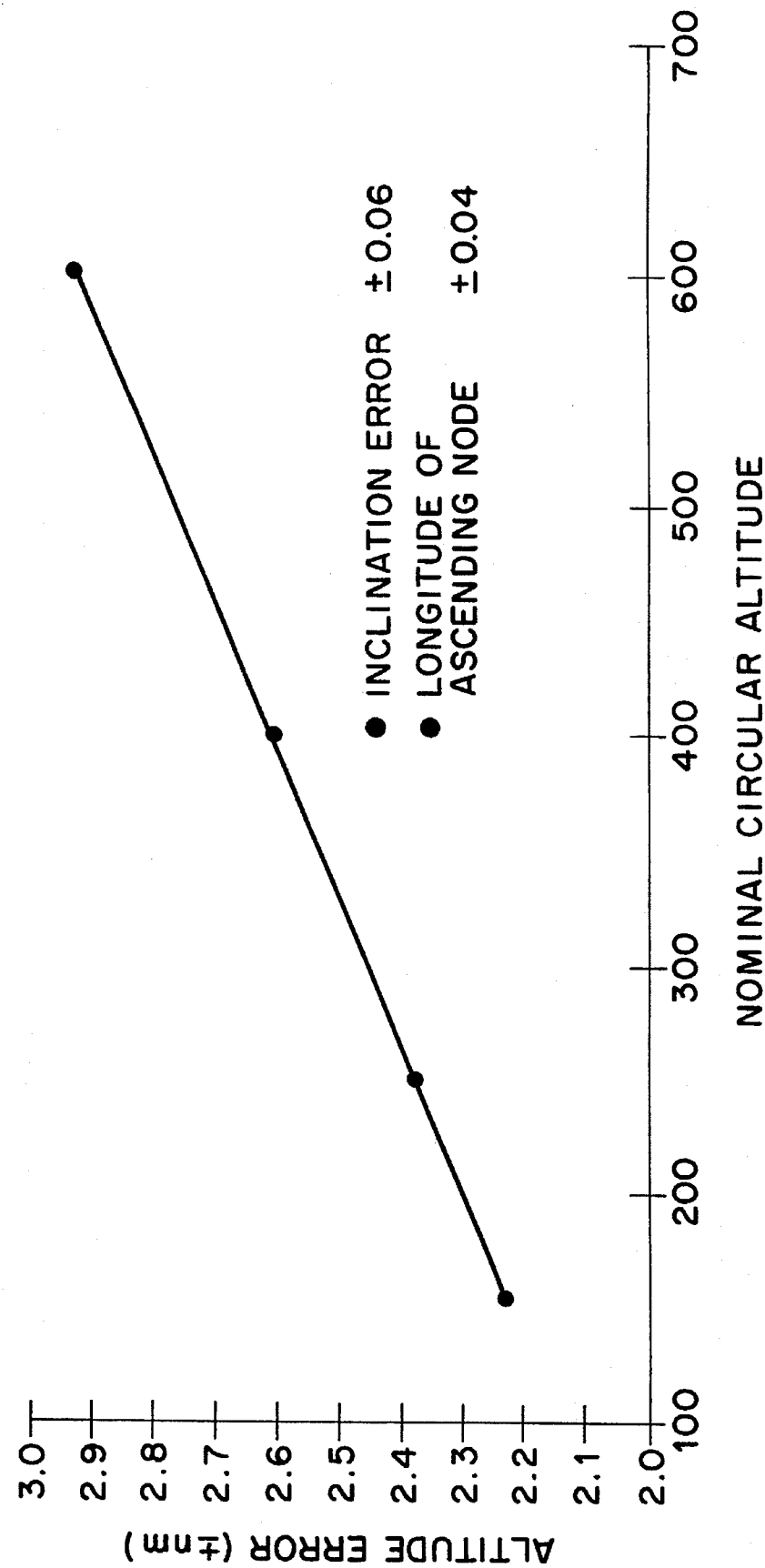
FIG. 49 is a graph showing injection accuracies.

The Orbital Assist Module 12 also houses the LLV Guidance, Navigation and Control (GN&C) system. The heart of the GN&C is the Litton LN-100L Inertial Navigation Unit (INU). This is a strapdown system which employs three nondithered Litton Zero-Lock™ 18 cm pathlength ring laser gyros (ZLG™) and three A-4 accelerometers together with a sophisticated 24-state Kalman filter. This is a low cost, advanced technology IMU which provides incremental velocity and angle data to the navigation software. It has a flight demonstrated performance of 0.4 to 0.6 nmi/hr (CEP) which validates simulations and exceeds SNU 84-1 type medium accuracy requirements. Less than 500 cubic inches in volume, it weighs 18.5 pounds and uses 27 watts. No scheduled calibration is required. Prelaunch alignment using the built in gyrocompassing software employing the 24 state Kalman filter will provide the 3σ injection accuracies indicated in FIG. 49. The sensitivity of this unit allows the LLV to place a typical payload within one nautical mile of altitude and 0.02° inclination of the desired orbit.

Umbilical connectors (not shown), which are pulled at separation, provide the electrical interface to the LLV avionics and pass through to the T-0 umbilical. For spacecraft T-0 umbilical functions, there are 74 shielded copper circuits of several wire gauges. These circuits are carried through the equipment section and the fly away umbilical to a utility room located beneath the launch pad. From there they may be routed either to a launch control van via a two way fiber optic data system or to local equipment in accordance with the satellites requirements. Routed along with these circuits are two fiber optic cables which are used by the satellite to provide a high data rate path with the satellite. These can be used for memory verifications and other operations which are frequently limited by the bandwidth of the launch pad data link. They include analog monitors for battery voltages, pressures, etc. discrete on/off indications, and signal conditioned continuity loops which may be routed through the satellite to provide reset or safe loop indicators. These are in addition to the separation indicators which are dedicated to that purpose. Commands are generated by the flight computer in accordance with satellite specified criteria. These are used to initialize satellite inertial reference systems, open shutter, or similar spacecraft functions requiring actuation prior to separation.

Referring to FIGS. 50 to 54, circuits are shown for an analog telemetry monitor (FIG. 50) of which ten are provided; a discrete telemetry monitor (FIG. 51) of which ten are again provided; a continuity loop circuit (FIG. 52) (five are provided); a separation indicator (FIG. 53) of which five are provided; and a circuit for issuing commands to the satellite (FIG. 54) of which eight are provided.

In order to allow the final stage motor 27 to be discarded a separable joint is required between the OAM 12 and the motor 27. FIGS. 43, 44 and 47 clearly illustrate a zip separation joint 240 which allows separation of the final stage motor 27 from the Orbital Assist Module 12. Although the zip separation joint 240 could be made in a manner similar to the joint 70, described above and, the need for a clean, fully enclosed explosive joint is not necessary in this particular application since the Orbital Assist Module 12 is provided with a solid base just above the zip separation joint 240, thereby avoiding any contamination of the electronics in the Orbital Assist Module 12 or the payload 21. Accordingly a simplified version of an explosive joint may be used is as illustrated in FIGS. 55 and 56. The explosive material 242, in this joint is not contained in a sealed flexible tube as was the case in the joint 70. The joint 240 simply includes a first bracket 244 bolted by means of bolts 246 to a second bracket 248, the brackets 244 and 248 defining a cavity 250 between them which accommodates the explosive material 242. The bracket 248 further includes a zone of weakening 252 which ruptures during detonation of the material 242 thereby releasing the bracket 244 and part of the bracket 248 from the remaining portion of the bracket 248, as shown in FIG. 51. FIGS. 55 and 56 further illustrate a third bracket 254 bolted by means of a bolt 256 to the bracket 248. The bracket 254 defines a lip 258 which engages complimentarily with an end portion of the bracket 244.

It will be appreciated that all separable joints in the rocket system 10 will take the form either of a clean, enclosed explosive joint as described for the connection 70, or will be of the simpler variety as described for the zip separation joint 240. The appropriate joint to be used will be determined by the need to avoid contamination of sensitive instrumentation. Thus any separable joints located below the zip separation joint 240 will take the form of the joint as described with respect to FIGS. 55 and 56. Referring again to FIGS. 34, 36 and 37, the zip separation joints of the type described with reference to FIGS. 55 and 56 are indicated by reference numeral 280.

Considering, for example, FIG. 37, it will be seen that the first stage 22 is spaced from the second stage 24 by an interstage section 38 which is illustrated in greater detail in FIG. 57. The interstage 38 comprises a cylindrical tube 284 connected by means of a zip separation joint 286 to the second stage 24 (FIG. 37). The trailing end of the cylinder 284 is, in turn, connected by means of a non-separable connector, (not shown) to the first stage 22.

The non-separable connector is illustrated in greater detail in FIG. 58 and is indicated generally by reference number 290. The wall 292 of the first stage 22 defines a circumferentially extending step 294, thereby allowing the wall 292 to be received complimentarily by the interstage 38. The reduced diameter portion 296 of the wall 292 is provided with a nut 298 secured to its inner wall by means of a rivet 300. This allows the interstage 38 to be secured to the first stage 22 by means of a bolt 302 as illustrated in FIG. 58.

The use of an interstage 38 ensures that the first stage 22 is spaced from the second stage 24, thereby avoiding interference with the nozzle 304 (FIG. 35) of the second stage 24. Similarly an interstage 38 is provided between the second stage 24 and the final stage 27 with vertical dimensions suitable to accommodate the nozzle of the final stage 27.

It should be noted that the first and second stages differ insofar as their nozzles have different lengths, as is illustrated in FIG. 59. Typically the second stage nozzle 34 is fractionally longer than that of the first stage.

Referring to FIGS. 60 to 68, the strap-on motors 32 will now be described in detail. FIGS. 60 and 61, specifically show different size strap-on motors which are indicated by reference numerals 310 and 312, respectively. In this way, the load carrying capacity can be varied depending on the thrust provided by the strap-on motors 32. In addition, or alternatively, boost power can be varied by using an appropriate number of strap-on motors 32 as illustrated in FIGS. 62, 63 and 64. Although not illustrated, a system using 3 strap-on motors 32 could be used. As is illustrated in FIGS. 60 and 61 the nozzles of the strap-on motors 32 are angled outwardly to provide the appropriate thrust.

It is envisaged that the strap-on motors 32 remain attached to the first stage 22 and are not separately discarded. However, the option exists of discarding the strap-on motors 32 separately by making use of suitable connectors as illustrated in FIGS. 65 and 66. FIG. 65 illustrates a connector 314 for releasably connecting the upper end of the motor 32. The connector 314 includes a bracket 316 which forms a socket 317 for complimentarily receiving a hemispherical ball connector 318 secured to an attachment formation 320 extending laterally outwardly from the motor 32. An annular member 322 secures the bolt 318 to the bracket 360 by being held in abutment with the bracket 316 by means of a ring 324 having a complimentary inner surface 326.

The lower connector 330 is formed in a similar manner to the connector 314 with the exception that the ball 332 and socket 336 are angled downwardly instead of being aligned substantially horizontally.

Should it be desired to release the motors 32 separately from the first stage 22 the ring 324 could be ruptured explosively, thereby releasing the annular formation 322 and permitting the ball 318, 332 to be released from the socket 317, 334 of the bracket 316, 336. The release of the motor 32 could be assisted by means of thrustor spring in a manner similar to the thrustor springs 73 described above. FIGS. 67 and 68 show the connector 330, and specifically illustrate suitable casings 338 for supporting such thrustor springs. These are secured by means of brackets 340, 342 to the first stage 22 and the strap-on motor 32, respectively.

We claim:

1. A launch vehicle system, which includes at least one primary solid fuel motor; an attitude control system connected to a leading end of the primary solid fuel motor; and a shroud releasably secured to a leading end of the attitude control system, the shroud tapering from a base towards an apex at its leading end, with a circumferential explosive seam extending circumferentially near the base in a plane perpendicular to the longitudinal axis of the launch vehicle system, and a pair of opposite longitudinal explosive seams extending longitudinally from the circumferentially extending seam towards the apex and defining two vertically extending shroud sections, the circumferential explosive seam means releases the shroud sections from the attitude control system, when activated, and the shroud including a plurality of vertically aligned thruster springs for exerting forces on the shroud along the longitudinal axis, the shroud further including at least one hinge at a base of each shroud section for pivotal outward movement of the shell sections under the action of the thruster spring, once the explosive seams have been activated.

2. A launch vehicle system of claim 1, in which the shroud includes two pairs of thruster springs, each pair being located at a junction of the circumferentially extending seam with a longitudinally extending seam, the springs in a pair being aligned parallel to each other, on either side of a longitudinally extending seam.

3. A launch vehicle system of claim 2, which includes at least one assistor spring spaced from the base of the shroud, and aligned perpendicularly to the longitudinally axis of the launch vehicle, for exerting a repelling, outward force between the shroud sections.

4. A launch vehicle system of claim 3, which includes a pair of assistor springs, each assistor spring spanning a longitudinally extending seam.

\* \* \* \* \*